(12) United States Patent
Hayakawa et al.

(10) Patent No.: US 11,485,354 B2
(45) Date of Patent: Nov. 1, 2022

(54) PARKING CONTROL METHOD AND PARKING CONTROL DEVICE

(71) Applicant: Nissan Motor Co., Ltd., Yokohama (JP)

(72) Inventors: Yasuhisa Hayakawa, Kanagawa (JP); Yasuhiro Sakurai, Kanagawa (JP); Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 96 days.

(21) Appl. No.: 16/652,499

(22) PCT Filed: Oct. 5, 2017

(86) PCT No.: PCT/JP2017/036323
§ 371 (c)(1),
(2) Date: Mar. 31, 2020

(87) PCT Pub. No.: WO2019/069430
PCT Pub. Date: Apr. 11, 2019

(65) Prior Publication Data
US 2020/0269833 A1    Aug. 27, 2020

(51) Int. Cl.
*B60W 30/06* (2006.01)
*B60W 60/00* (2020.01)
(Continued)

(52) U.S. Cl.
CPC ............ *B60W 30/06* (2013.01); *B60W 50/14* (2013.01); *B60W 60/001* (2020.02);
(Continued)

(58) Field of Classification Search
CPC .... B60W 30/06; B60W 60/001; B60W 50/14; G08G 1/16; G01C 21/3691; G01C 21/3415; G05D 1/0214; B62D 15/0285
See application file for complete search history.

(56) References Cited

U.S. PATENT DOCUMENTS

2010/0138146 A1* 6/2010 Vogt .................. G01C 21/3632
701/533
2015/0073661 A1* 3/2015 Raisch ............... B62D 15/0285
701/41
(Continued)

FOREIGN PATENT DOCUMENTS

CN       107499307 B  *  1/2021  ............. B60Q 9/006
DE    102011086210 A1     5/2013
(Continued)

OTHER PUBLICATIONS

CN107499307B—English Trans (Year: 2016).*
DE 102017115988A1—English translation (Year: 2017).*

*Primary Examiner* — Nicholas Kiswanto
*Assistant Examiner* — Renee LaRose
(74) *Attorney, Agent, or Firm* — Young Basile Hanlon & MacFarlane, P.C.

(57) ABSTRACT

A parking control method calculates a first control instruction and causing a control device of a vehicle to execute the first control instruction on the basis of an operation command acquired from an operator. The first control instruction is for moving the vehicle along a first route to a target parking space. The parking control method includes: when detecting an object after start of execution of the first control instruction, presenting the operator with selection information for selecting a first mode in which the execution of the first control instruction is continued or a second mode in which the control device of the vehicle is caused to execute an alternative control instruction for moving the vehicle along an alternative route different from the first route; and causing the control device to execute the first control instruction or the alternative control instruction in accordance with selection input information from the operator.

10 Claims, 21 Drawing Sheets

(51) Int. Cl.
  *G01C 21/34*   (2006.01)
  *B60W 50/14*   (2020.01)
  *G01C 21/36*   (2006.01)
  *G05D 1/02*    (2020.01)
  *G08G 1/16*    (2006.01)

(52) U.S. Cl.
  CPC ..... *G01C 21/3415* (2013.01); *G01C 21/3691* (2013.01); *G05D 1/0214* (2013.01); *G05D 1/0276* (2013.01); *G08G 1/16* (2013.01)

(56) References Cited

U.S. PATENT DOCUMENTS

2017/0259812 A1* 9/2017 Tomozawa ........... B62D 15/027
2018/0308359 A1  10/2018 Hayakawa

FOREIGN PATENT DOCUMENTS

| | | |
|---|---|---|
| DE | 102012203235 A1 | 9/2013 |
| DE | 102015003964 A1 | 9/2016 |
| DE | 102017115988 A1 * | 1/2019 |
| JP | 2008-074296 A | 4/2008 |
| JP | 2013-043475 A | 3/2013 |
| JP | 2015-003615 A | 1/2015 |
| WO | 2017/068695 A1 | 4/2017 |

* cited by examiner

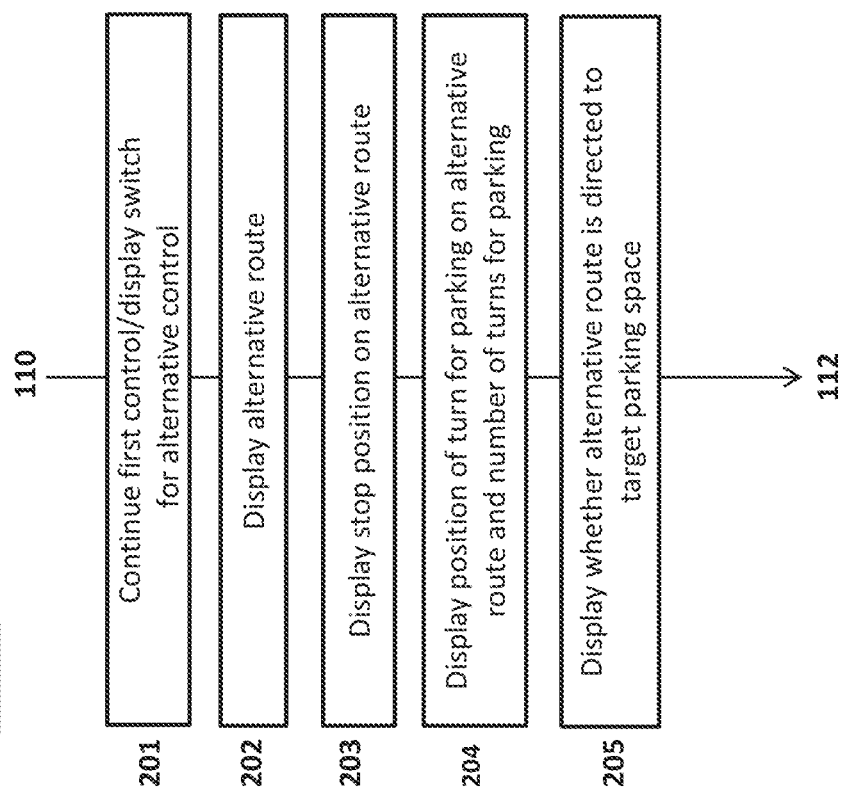

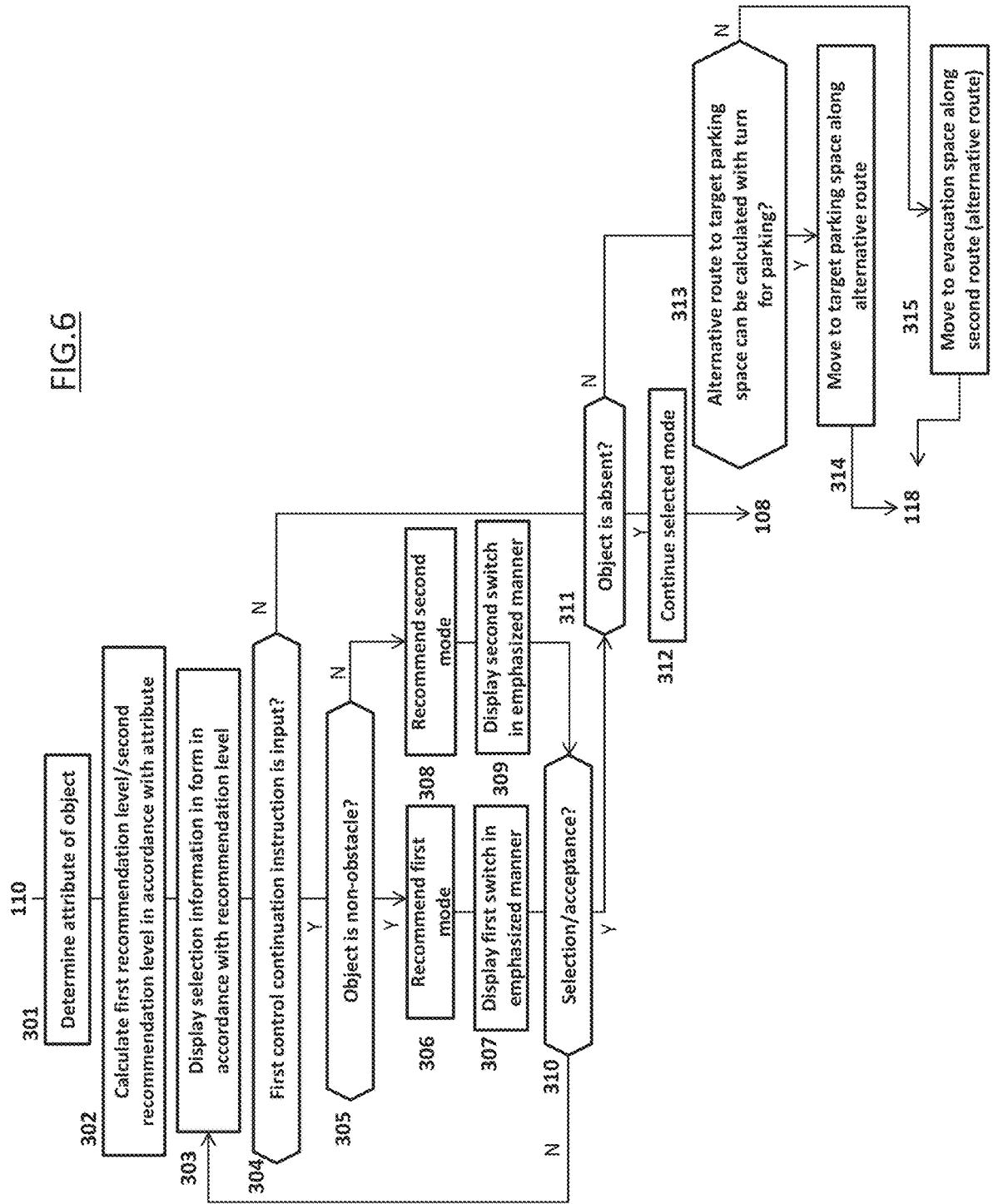

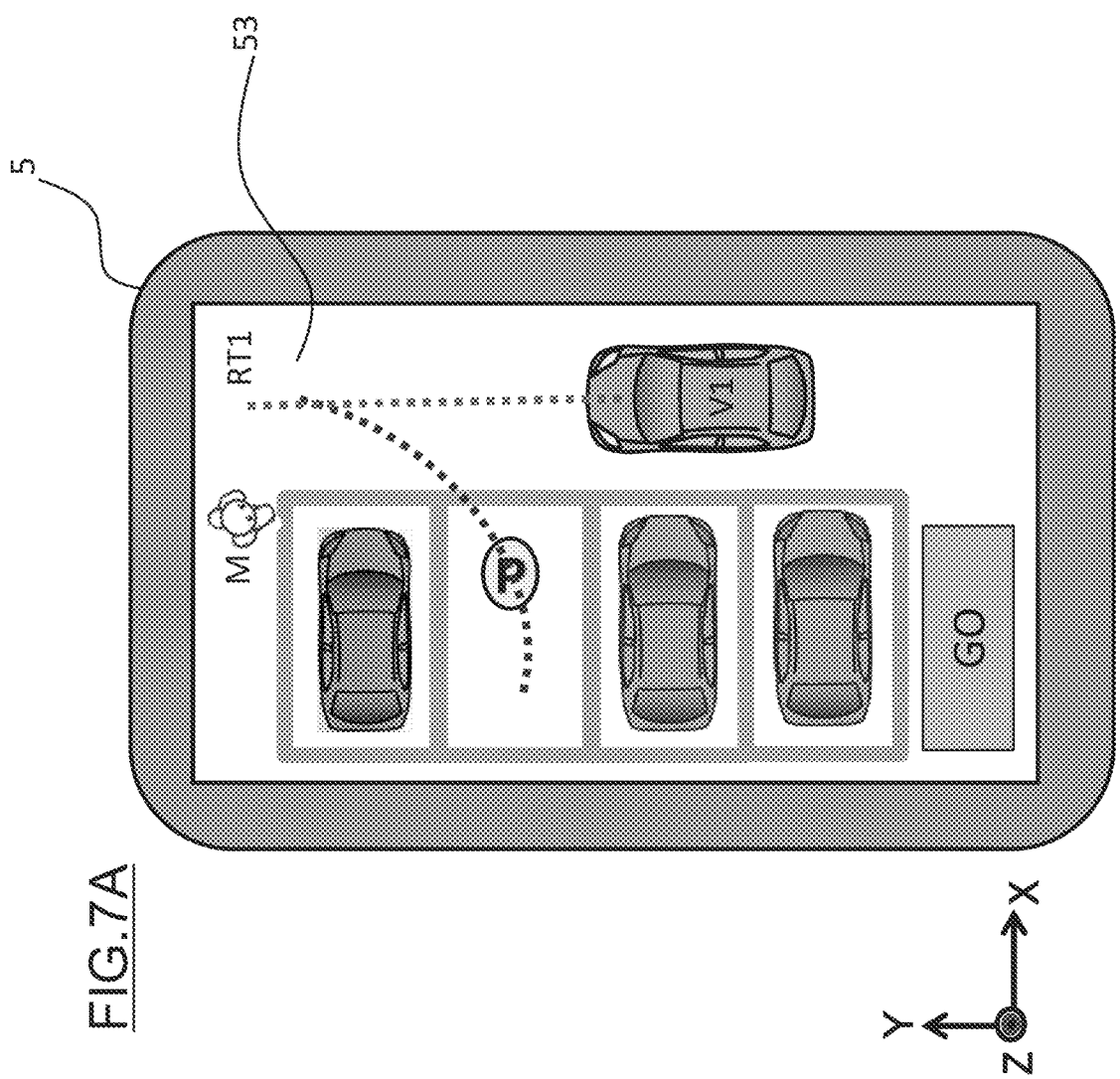

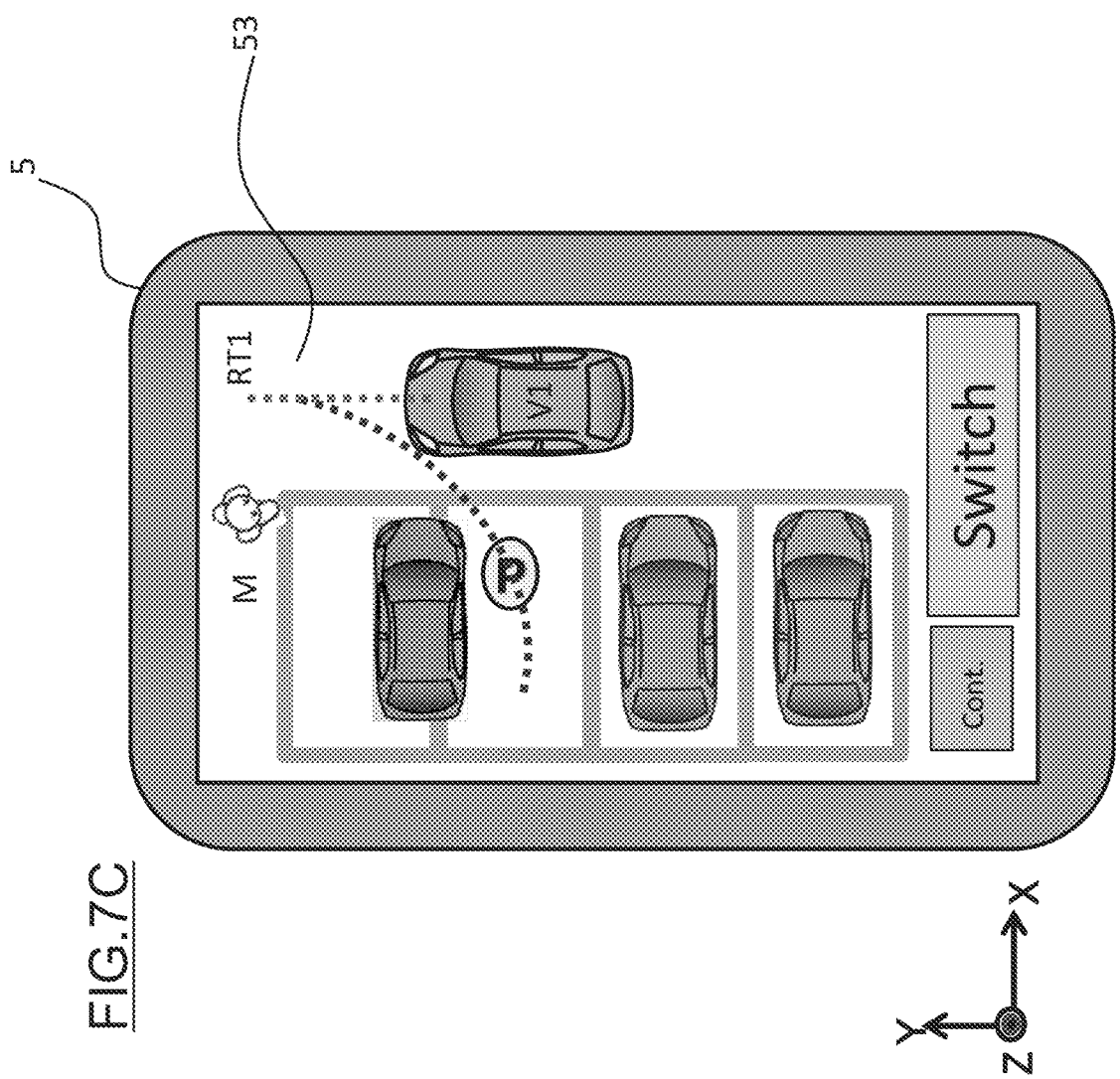

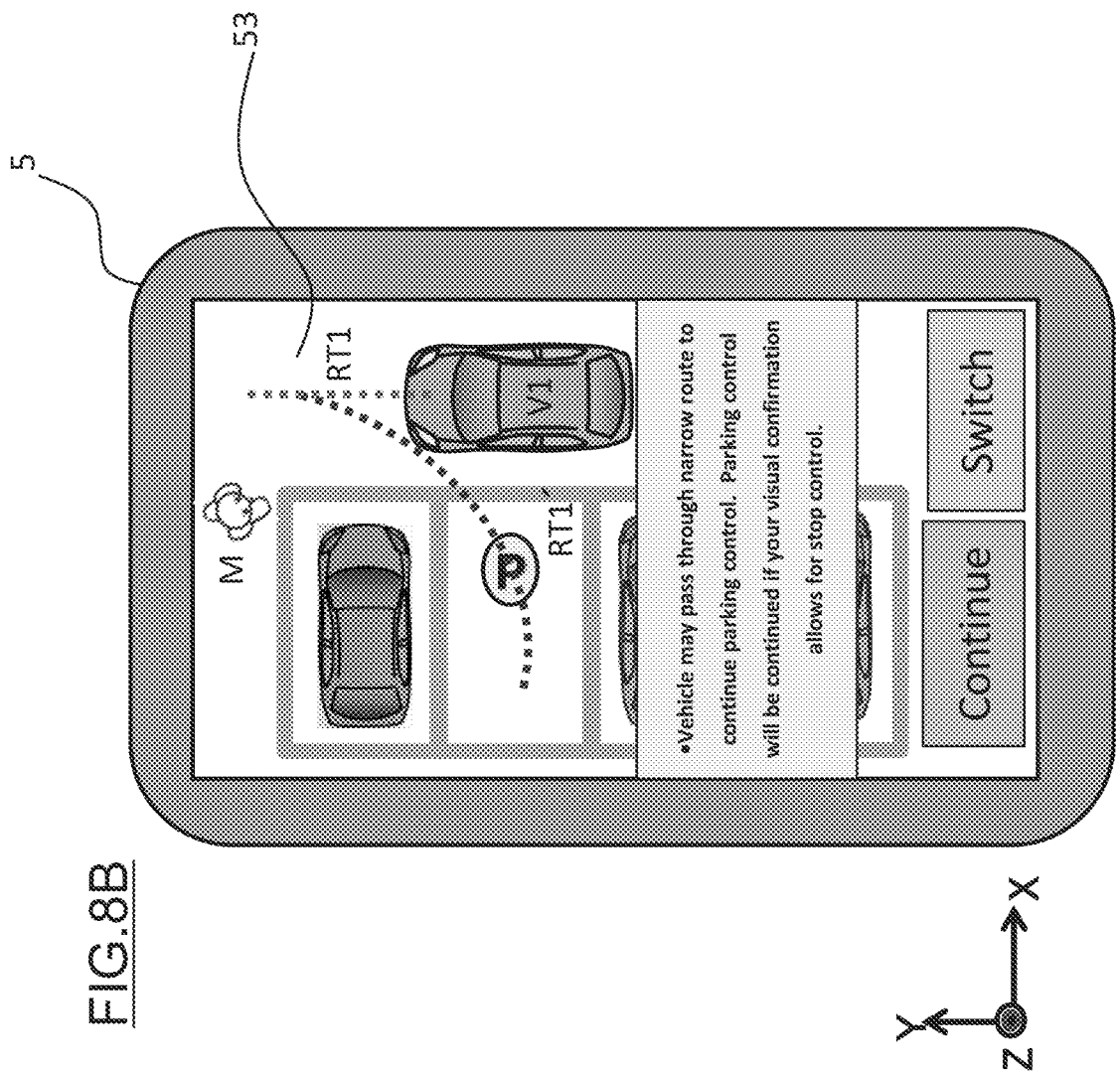

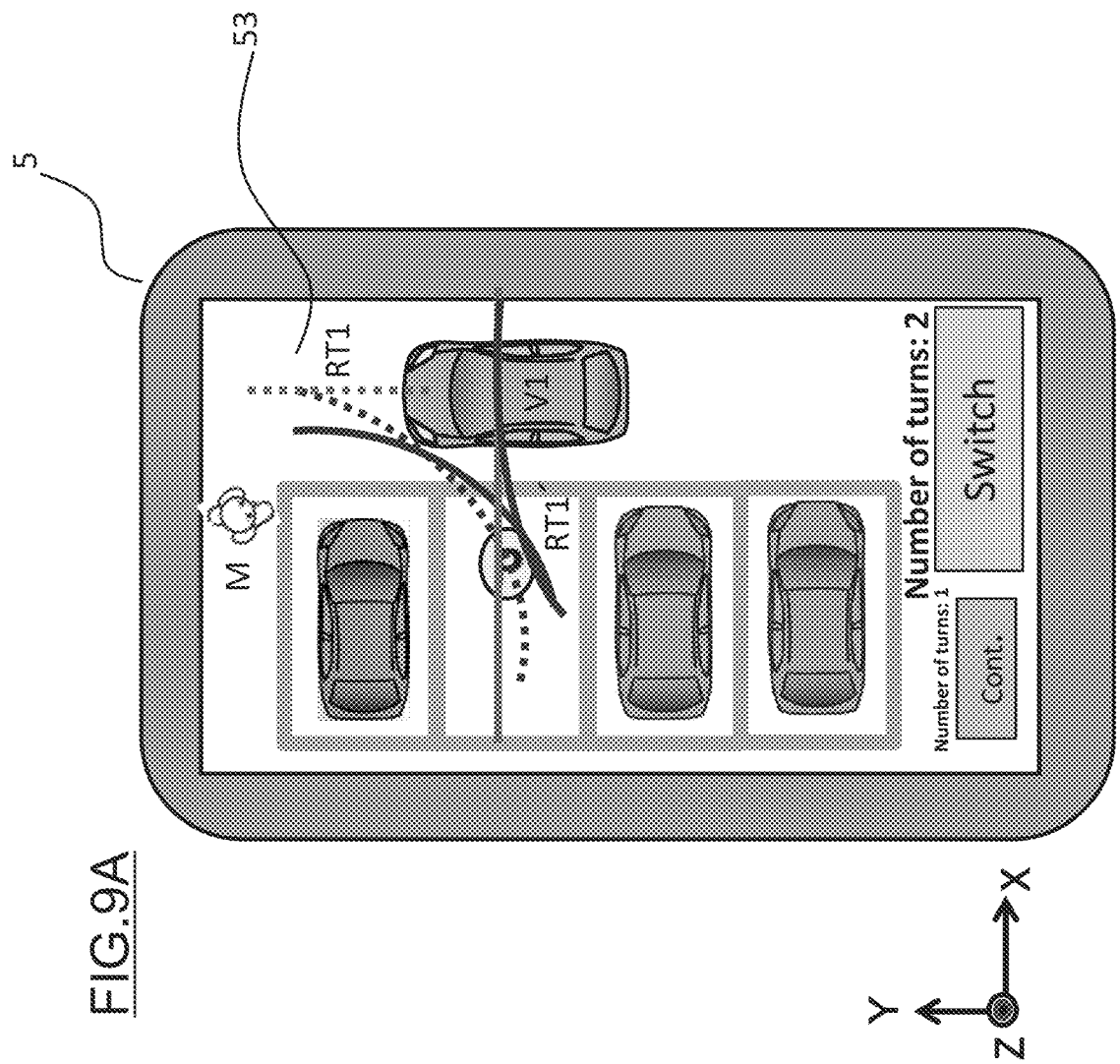

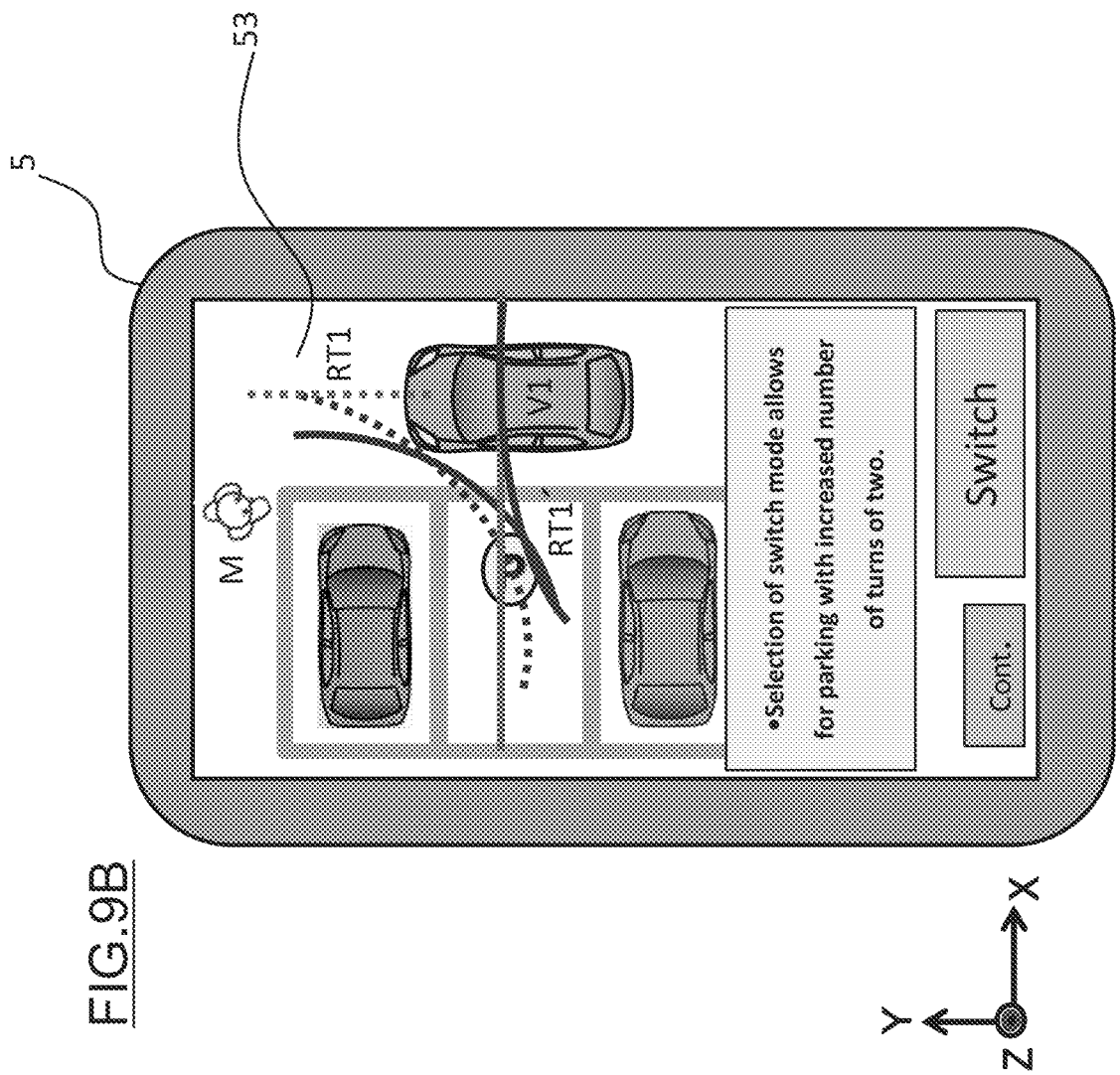

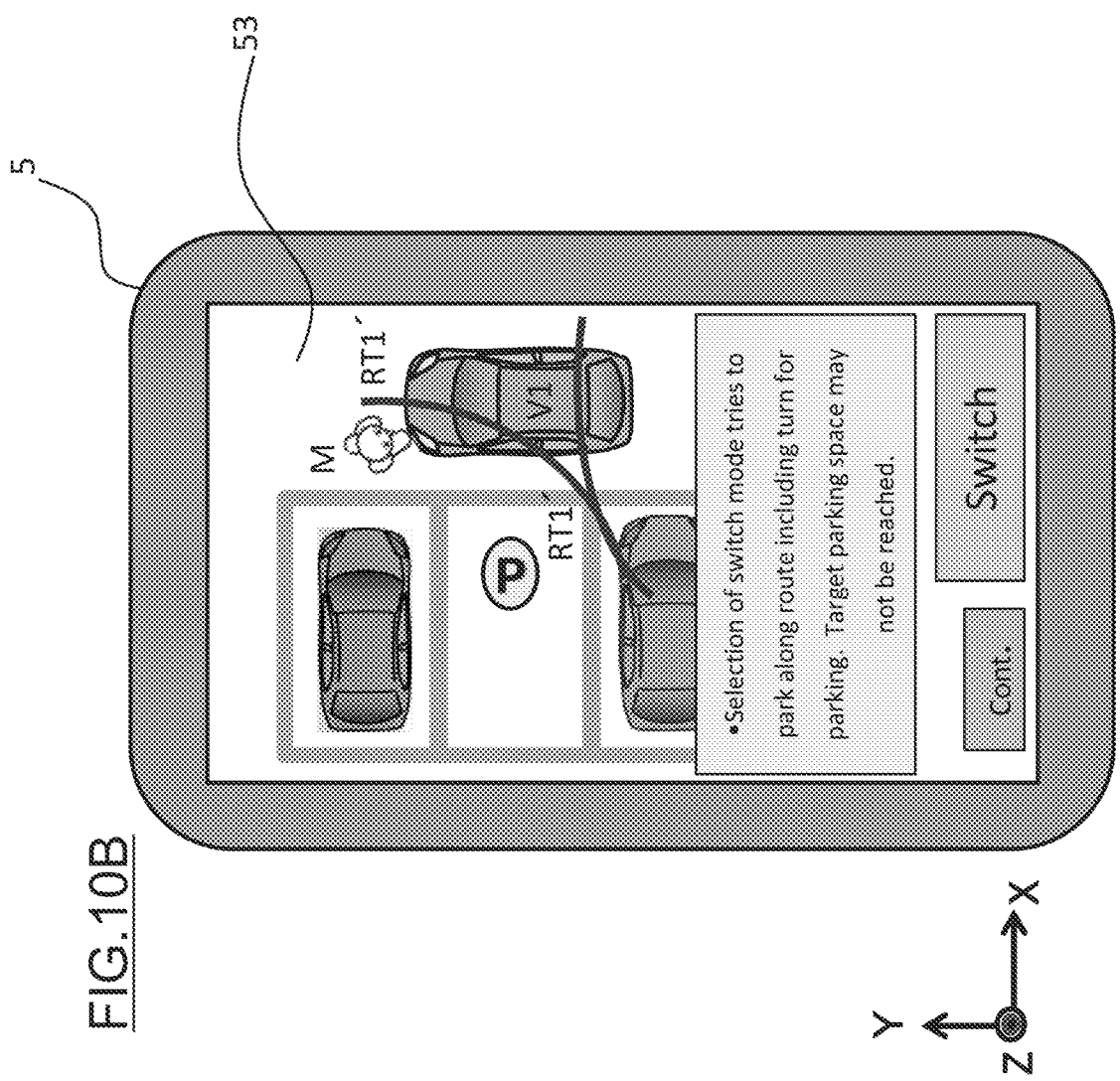

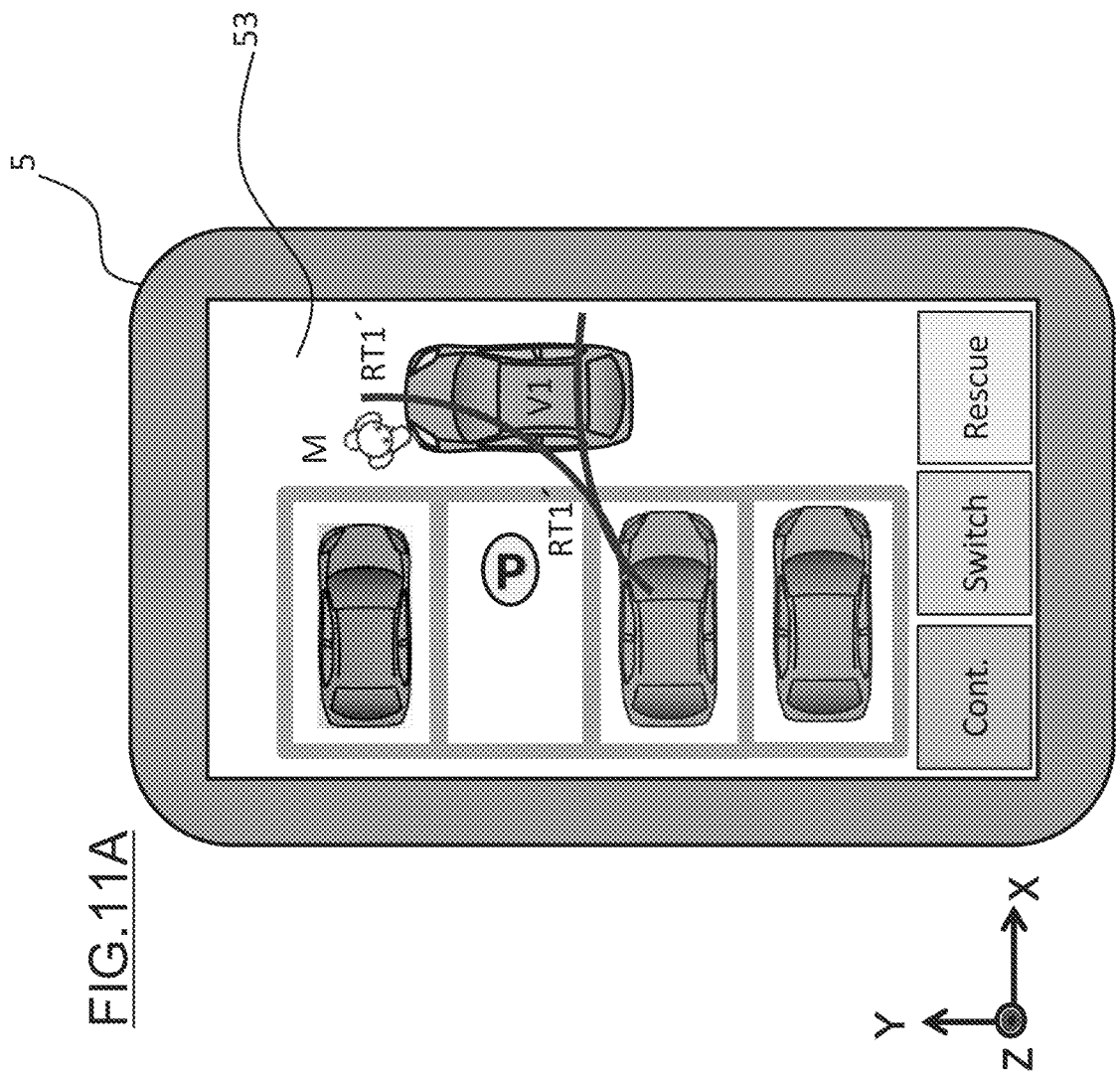

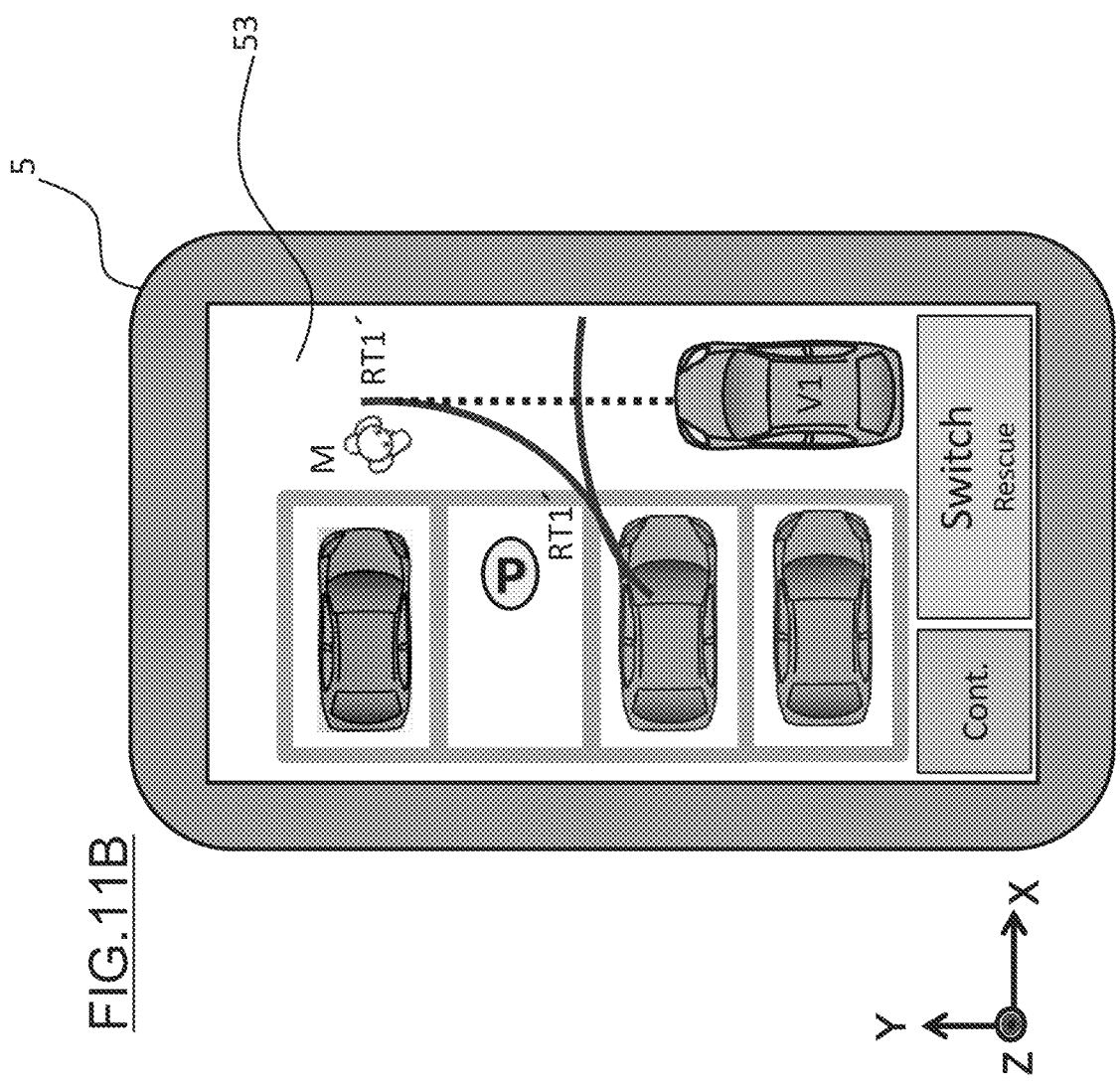

PARKING CONTROL METHOD AND PARKING CONTROL DEVICE

TECHNICAL FIELD

The present invention relates to a parking control method and a parking control apparatus.

BACKGROUND

A technique is known in which when a vehicle is parked into a parking space by being operated from outside of the vehicle, the vehicle is controlled to make a stop if an object is detected around the vehicle (JP2008-074296A).

SUMMARY

In the above prior art, the vehicle is controlled to make a stop even when the operator desires to continue the parking control, so the autonomous (automated) parking control may not be executed in accordance with the intention of the operator.

A problem to be solved by the present invention is to confirm the intention of an operator when an object is detected and execute the autonomous parking control in accordance with the intention of the operator.

The present invention solves the above problem through, when detecting an object after the start of execution of a first control instruction for moving a vehicle along a first route to a target parking space, presenting an operator with selection information for selecting a first mode in which the execution of the first control instruction is continued or a second mode in which an alternative control instruction is executed for moving the vehicle along an alternative route different from the first route, and causing a control device to execute the selected first control instruction or alternative control instruction.

According to the present invention, when an object is detected, the control instruction being executed is continued or the alternative control instruction for moving the vehicle along the alternative route is executed on the basis of the selection input from the operator, and the parking process can therefore be executed in accordance with the intention of the operator without unexceptionally stopping the vehicle.

BRIEF DESCRIPTION OF THE DRAWINGS

FIG. 5 is a flowchart illustrating an example of a parking control process based on selection information;

FIG. 6 is a flowchart illustrating an example of a presentation process for selection information;

FIG. 7A is a first diagram for describing a first presentation process for selection information;

FIG. 7C is a third diagram for describing the first presentation process for selection information;

FIG. 8B is a second diagram for describing the second presentation process for selection information;

FIG. 9A is a first diagram for describing a third presentation process for selection information;

FIG. 9B is a second diagram for describing the third presentation process for selection information;

FIG. 10B is a second diagram for describing the fourth presentation process for selection information;

FIG. 11A is a first diagram for describing a fifth presentation process for selection information; and FIG. 11B is a second diagram for describing the fifth presentation process for selection information.

DETAILED DESCRIPTION

Hereinafter, one or more embodiments of the present invention will be described with reference to the drawings.

In the embodiments, the present invention will be described by exemplifying a case in which the parking control apparatus according to the present invention is applied to a parking control system. The parking control apparatus may also be applied to a portable operation terminal (equipment such as a smartphone or a PDA: Personal Digital Assistant) capable of exchanging information with an onboard apparatus. The parking control method according to the present invention can be used in the parking control apparatus, which will be described below.

Figure 1:
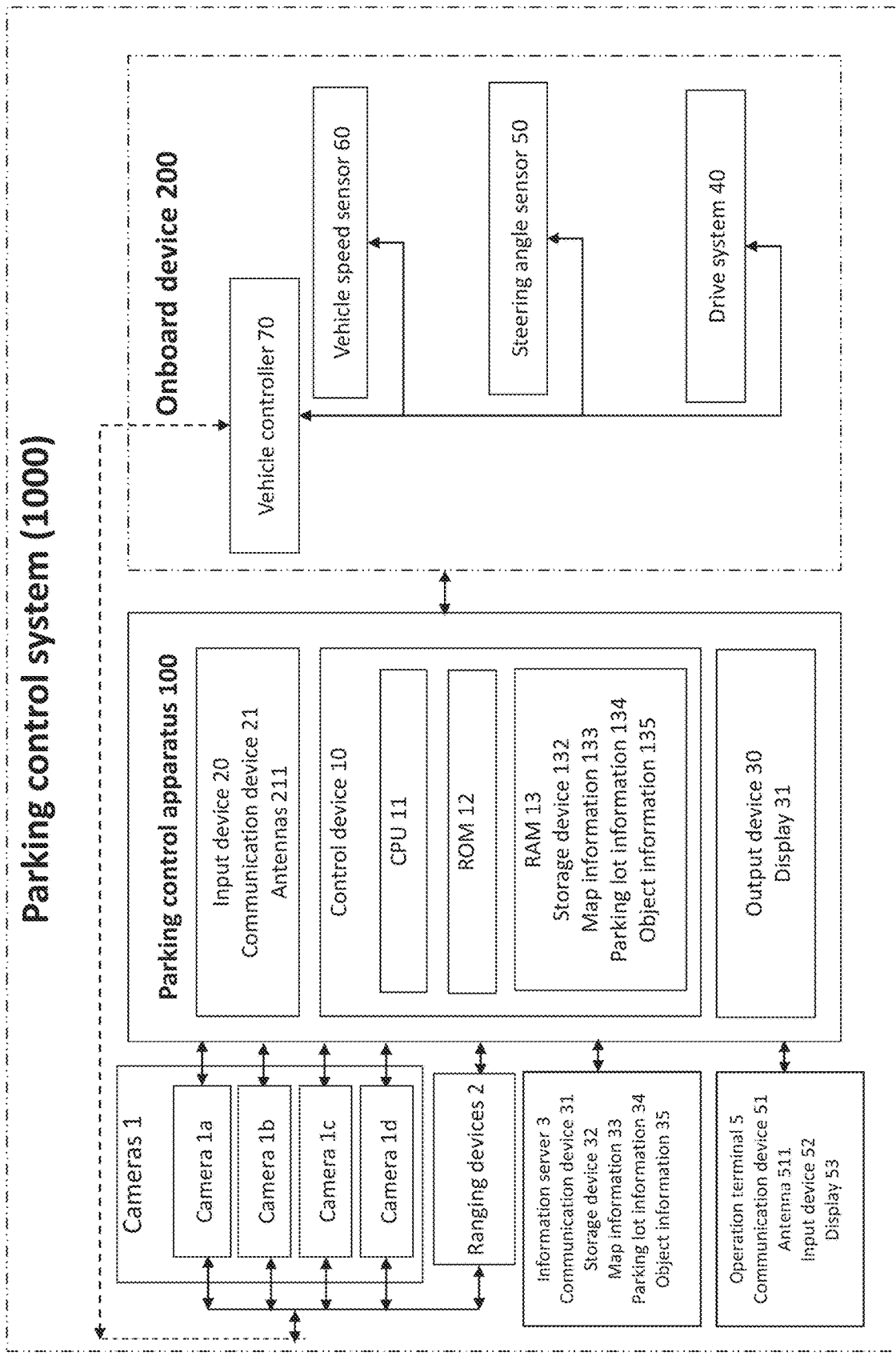
FIG. 1 is a block diagram illustrating an example of a parking control system according to one or more embodiments of the present invention.

FIG. 1 is a block diagram of a parking control system 1000 including a parking control apparatus 100 according to one or more embodiments of the present invention. The parking control system 1000 according to one or more embodiments of the present invention includes cameras 1a to 1d, ranging devices 2, an information server 3, an operation terminal 5, the parking control apparatus 100, a vehicle controller 70, a drive system 40, a steering angle sensor 50, and a vehicle speed sensor 60.

The parking control apparatus 100 according to one or more embodiments of the present invention causes a control device (ECU: Engine Control Unit) of a vehicle to execute a first control instruction (parking control instruction) for moving the vehicle as the target of control along a first route to a target parking space (parking lot), on the basis of an operation command acquired from an operator. The parking control apparatus 100 according to one or more embodiments of the present invention controls the operation of moving (parking) a vehicle V as the target of control into a target parking space on the basis of an operation command that is input from the operation terminal 5.

The parking control apparatus 100 according to one or more embodiments of the present invention controls the operation of moving the vehicle V so as to make the vehicle V leave from the target parking space, (so as to separate the vehicle V from the target parking space), (so that the vehicle V is/becomes distant from the target parking space), (so that the vehicle V escapes from the target parking space), on the basis of an operation command that is input to the operation terminal 5 by an operator M located outside the vehicle V. One or more embodiments of the present invention will be described with reference to an exemplary case in which the operator M is located outside the vehicle V, but the operator M may be located inside the vehicle interior of the vehicle V1. In another case, occupants including the driver may be located inside the vehicle interior while the operator M (such as a manager of the parking lot) may be located outside the vehicle.

The operation terminal 5 is a portable computer that can be brought out to outside of the vehicle V and has an input function and a communication function. The operation terminal 5 receives the input of an operation command made by an operator M for controlling the driving (operation) of the vehicle V for parking. The driving includes operations for parking (operations for entering a parking space and exiting the parking space). The operator M inputs instructions via the operation terminal 5. The instructions include an operation command for execution of parking. The operation command includes information on the execution/stop of parking control, selection/change of a target parking position, and selection/change of a parking route and other information necessary for parking. The operator M can also make the parking control apparatus 100 recognize the instructions including the operation command without using the operation terminal 5, such as by features of a captured image of a gesture made by the operator M (i.e., the operator M can input such instructions to the parking control apparatus 100 without using the operation terminal 5, such as by a gesture). Examples of operation commands that are input by the operator M via the operation terminal 5 include not only the operation command for executing the parking but also an evacuation command for the vehicle V to leave from the target parking space.

The operation terminal 5 includes a communication device and is capable of exchanging information with the parking control apparatus 100 and the information server 3. The operation terminal 5 transmits the operation command, which is input outside the vehicle, to the parking control apparatus 100 via a communication network and inputs the operation command to the parking control apparatus 100. The operation terminal 5 communicates with the parking control apparatus 100 using signals including a unique identification code. The operation terminal 5 includes a display 53. The display 53 presents an input interface and various information items. When the display 53 is a touch panel-type display, it has a function of receiving the operation command. The operation terminal 5 may be portable equipment, such as a smartphone or a PDA: Personal Digital Assistant, in which applications are installed for receiving an input of the operation command used in the parking control method according to one or more embodiments of the present invention and transmitting the operation command to the parking control apparatus 100.

The information server 3 is an information provision device provided on a network capable of communication. The information server 3 includes a communication device 31 and a storage device 32. The storage device 32 includes readable map information 33, parking lot information 34, and object information 35. The parking control apparatus 100 and the operation terminal 5 can access the storage device 32 of the information server 3 to acquire each information item.

The parking control apparatus 100 according to one or more embodiments of the present invention includes a control device 10, an input device 20, and an output device 30. These components of the parking control apparatus 100 are connected to one another via a controller area network (CAN) or other onboard LAN to mutually exchange information. The input device 20 includes a communication device 21. The communication device 21 receives the operation command transmitted from the external operation terminal 5 and inputs the operation command to the input device 20. The subject who inputs the operation command to the external operation terminal 5 may be a person (a user, a passenger, a driver, or a worker of a parking facility). The input device 20 transmits the received operation command to the control device 10. The output device 30 includes a display 31. The output device 30 notifies the driver of parking control information. The display 31 according to one or more embodiments of the present invention is a touch panel-type display having an input function and an output function. When the display 31 has an input function, it serves as the input device 20. Even when the vehicle V is controlled on the basis of the operation command which is input from the operation terminal 5, an occupant (driver or passenger) can input the operation command, such as a command for emergency stop, via the input device 20.

The control device 10 of the parking control apparatus 100 according to one or more embodiments of the present invention is a computer for parking control including a ROM 12 that stores a parking control program, a CPU 11 as an operation circuit that executes the program stored in the ROM 12 to serve as the parking control apparatus 100 according to one or more embodiments of the present invention, and a RAM 13 that serves as an accessible storage device.

The parking control program according to one or more embodiments of the present invention includes execution instructions for calculating a first control instruction for moving the vehicle V as the target of control along a first route to a target parking space on the basis of an operation command acquired from the operator M; causing a control device of the vehicle V to execute the first control instruction; when detecting an object after the start of execution of the first control instruction, presenting the operator M with selection information for selecting a first mode in which the execution of the first control instruction is continued or a second mode in which the control device of the vehicle V is caused to execute an alternative control instruction for moving the vehicle V along an alternative route different from the first route; and causing the control device to execute the first control instruction or the alternative control instruction in accordance with selection input information from the operator M.

The parking control apparatus 100 according to one or more embodiments of the present invention is a remote control-type apparatus that receives the operation command from the operation terminal 5 and controls the movement of the vehicle V to park the vehicle V into a given parking space. The occupant who operates the operation terminal 5 may be located outside the vehicle interior or may also be located inside the vehicle interior.

The parking control apparatus 100 according to one or more embodiments of the present invention may be of an autonomous (automated) control type in which the steering operation and the accelerator/brake operation are performed in an autonomous (automated) manner. The parking control apparatus 100 may also be of a semiautonomous (semiautomated) type in which the steering operation is performed in an autonomous manner while the driver performs the accelerator/brake operation.

In the parking control program according to one or more embodiments of the present invention, the user may arbitrarily select the target parking position, or the parking control apparatus 100 or the parking facility side may automatically set the target parking position.

The control device 10 of the parking control apparatus 100 according to one or more embodiments of the present invention has functions of executing a first control process of moving the vehicle V along the first route to a target parking space on the basis of the operation command acquired from the operator M, a process of presenting selection information on the display 53 of the operation terminal 5 when an object is detected after the start of execution of the first control instruction, and a parking control process of executing the first control instruction or the alternative control instruction in accordance with the selection input information from the operator M. The selection information refers to information for selecting the first mode in which the execution of the first control instruction is continued or the second mode in which the alternative control instruction is executed for moving the vehicle V along an alternative route other than the first route. Each of the above processes is executed by cooperation of software for implementing the process and the above-described hardware.

Some processes of detecting the position of the operator M will be described with reference to FIGS. 2A to 2D. The control device 10 acquires the position of the operator M. The position of the operator M is used for calculation of an evacuation space. The position of the operator M includes information on the position on the movement plane of the vehicle V. The position of the operator M includes information on the height position. The position of the operator M may be detected on the basis of the sensor signals from sensors provided in the vehicle V or may also be obtained through detecting the position of the operation terminal 5 carried by the operator M and calculating the position of the operator M on the basis of the position the operation terminal 5. The operation terminal 5 may be provided at a predetermined position or may also be carried by the operator M. When the operation terminal 5 is provided at a predetermined position, the operator M moves to the position at which the operation terminal 5 is provided, and uses the operation terminal 5 at that position. In these cases, the position of the operation terminal 5 can be employed as the position of the operator M.

Figure 2A:
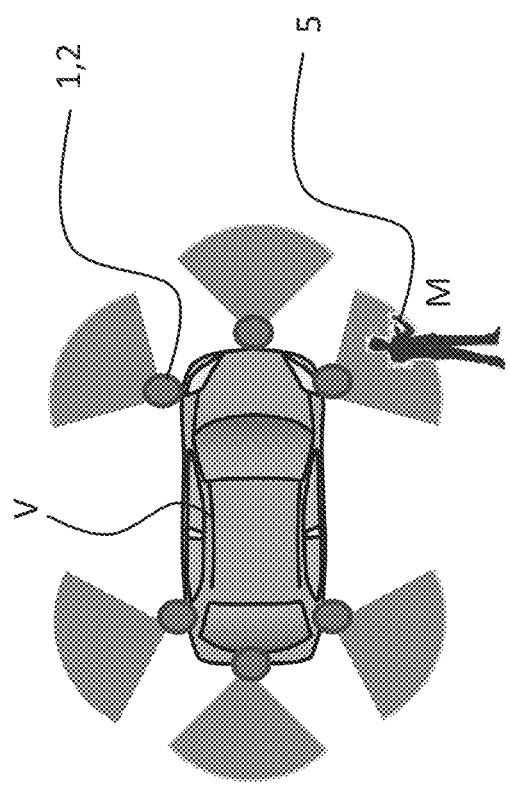
FIG. 2A is a diagram for describing a first detection scheme for the position of an operator.

As illustrated in FIG. 2A, the position of the operator M is detected on the basis of the detection results from the multiple ranging devices 2 provided in the vehicle and/or the images captured by the cameras 1. The position of the operator M can be detected on the basis of the images captured by the cameras 1a to 1d. The ranging devices 2 for use may each be a radar device, such as a millimeter-wave radar device, a laser radar device, or an ultrasonic radar device, or a sonar device. The multiple ranging devices 2 and their detection results can be identified, and the two-dimensional position and/or three-dimensional position of the operator M can therefore be detected on the basis of the detection results. The ranging devices 2 may be provided at the same positions as the cameras 1a to 1d or may also be provided at different positions. The control device 10 can also detect a gesture of the operator M on the basis of the images captured by the cameras 1a to 1d and identify the operation command associated with features of the image of the gesture.

Figure 2B:
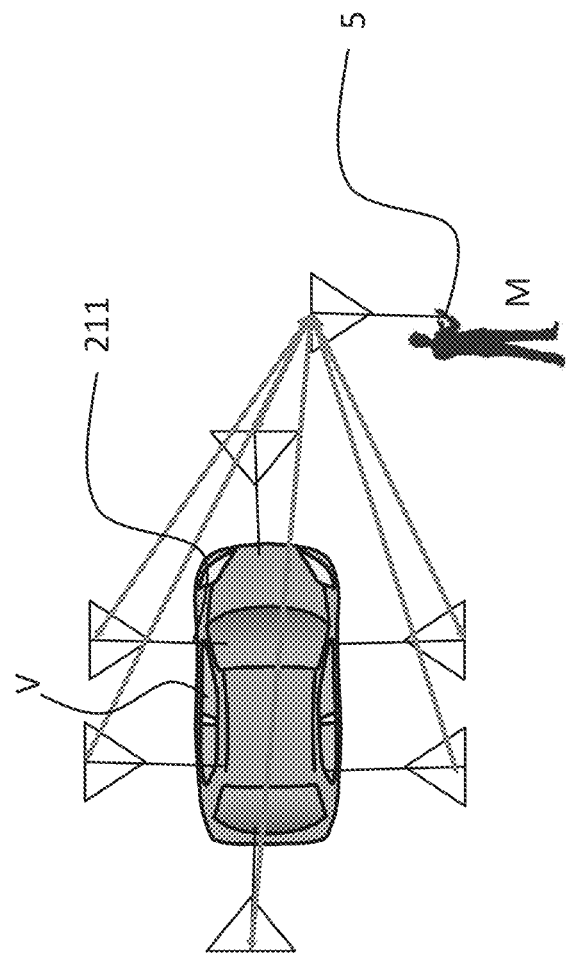
FIG. 2B is a diagram for describing a second detection scheme for the position of an operator.

As illustrated in FIG. 2B, the position of the operation terminal 5 or of the operator M carrying the operation terminal 5 may also be detected on the basis of the communication radio waves between multiple antennas 211 provided at different positions of the vehicle V and the operation terminal 5. When the multiple antennas 211 communicate with one operation terminal 5, the intensity of the received radio wave of each antenna 211 is different. The position of the operation terminal 5 can be calculated on the basis of the intensity difference between the received radio waves of the antennas 211. The two-dimensional position and/or three-dimensional position of the operation terminal 5 or of the operator M can be calculated from the intensity difference between the received radio waves of the antennas 211.

Figure 2C:
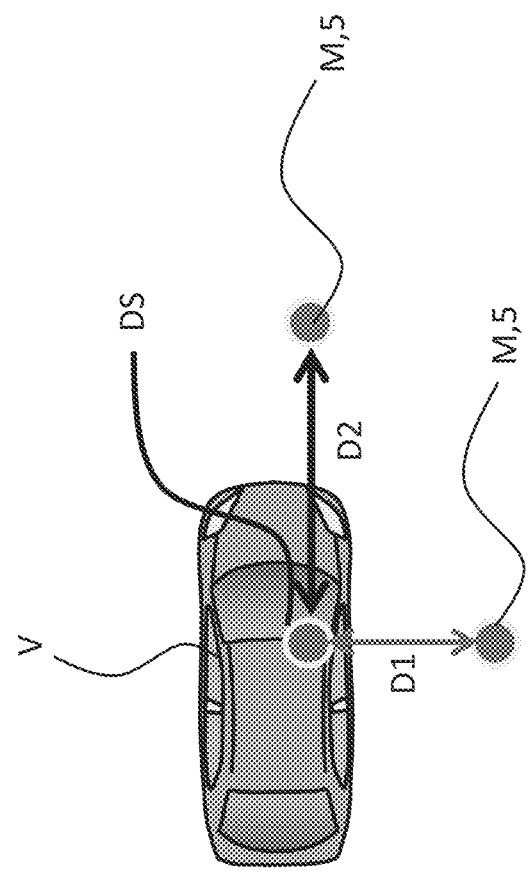
FIG. 2C is a diagram for describing a third detection scheme for the position of an operator.

As illustrated in FIG. 2C, a predetermined position (direction/distance: D1, D2) with respect to the driver seat DS of the vehicle V may be preliminarily designated as the operating position of the operator M or as the position at which the operation terminal 5 is disposed. For example, when the operator M temporarily stops the vehicle V at a designated position and gets off the vehicle V to operate the operation terminal 5 provided at the predetermined position, it is possible to calculate the initial position of the operator M with respect to the vehicle V or the initial position of the terminal 5, which is carried by the operator M, with respect to the vehicle V.

Figure 2D:
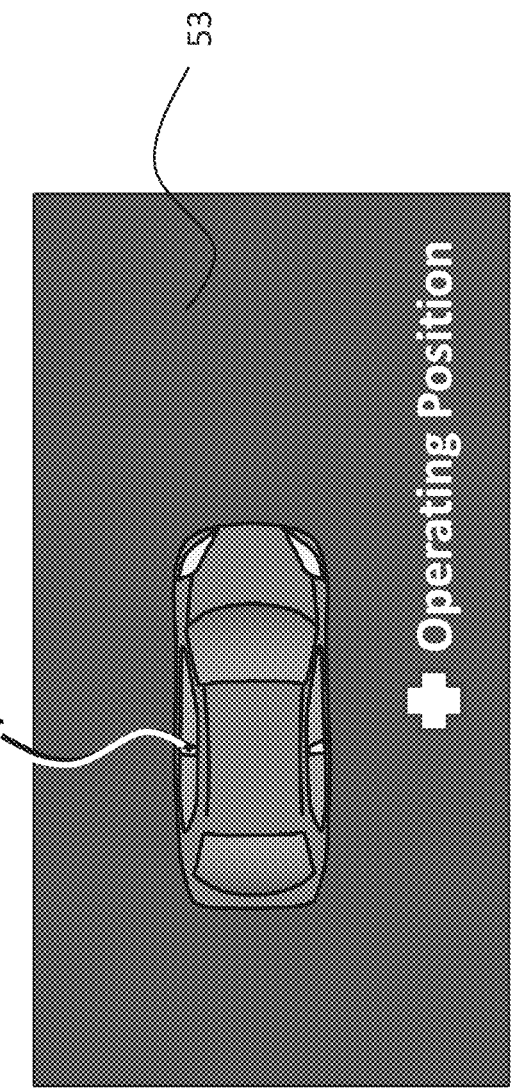
FIG. 2D is a diagram for describing a fourth detection scheme for the position of an operator.

As illustrated in FIG. 2D in a similar manner, image information representing the operating position (a position at which the operator M stands: operation position) with respect to the vehicle V is displayed on the display 53 of the operation terminal 5. This display control may be executed by an application installed on the operation terminal 5 side or may also be executed on the basis of a command from the control device 10.

The detection process for an object will be described with reference to FIGS. 3A and 3B. In one or more embodiments of the present invention, "objects" include structures, such as walls and pillars of a parking lot, installations around the vehicle, pedestrians, other vehicles, parked vehicles, etc.

Figure 3A:
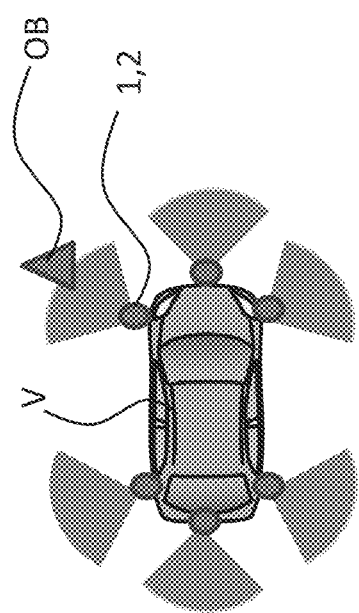
FIG. 3A is a diagram for describing a first detection scheme for an object.

As illustrated in FIG. 3A, an object is detected on the basis of the detection results from the multiple ranging devices 2 provided in the vehicle V and/or the images captured by the cameras 1. The ranging devices 2 detect the existence or absence of an object, the position of the object, the size of the object, and the distance to the object on the basis of the received signals from the radar devices. Additionally or alternatively, the existence or absence of an object, the position of the object, the size of the object, and the distance to the object may be detected on the basis of the images captured by the cameras 1a to 1d. The detection of an object may be performed using a motion stereo technique with the cameras 1a to 1d. The detection results are used to determine whether or not a parking space is empty (whether or not a vehicle is parked in the parking space).

Figure 3B:
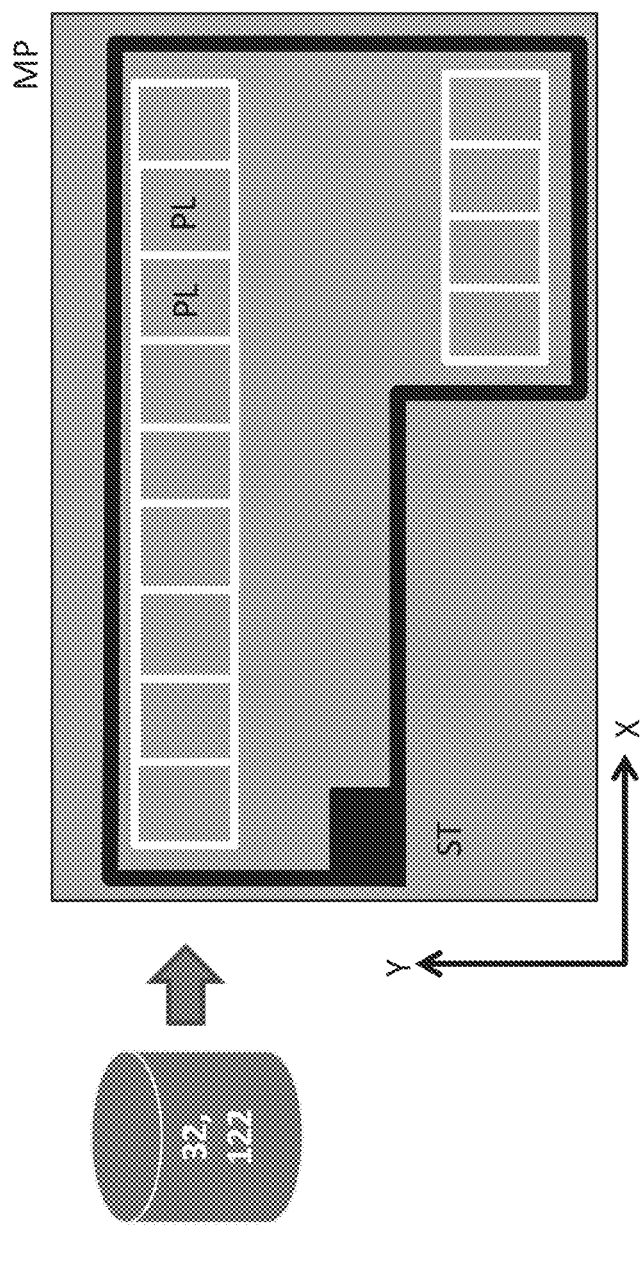
FIG. 3B is a diagram for describing a second detection scheme for an object.

As illustrated in FIG. 3B, objects including structures such as walls and pillars of a parking lot can be detected on the basis of the parking lot information 34 acquired from the storage device 32 of the information server 3. The parking lot information includes the location and identification number of each parking lot and positional information of passages, pillars, walls, storage spaces, etc. in the parking facility. The information server 3 may be managed by staffs of the parking lot.

The control procedure of parking control will be described below with reference to the flowchart illustrated in FIG. 4.

Figure 4:
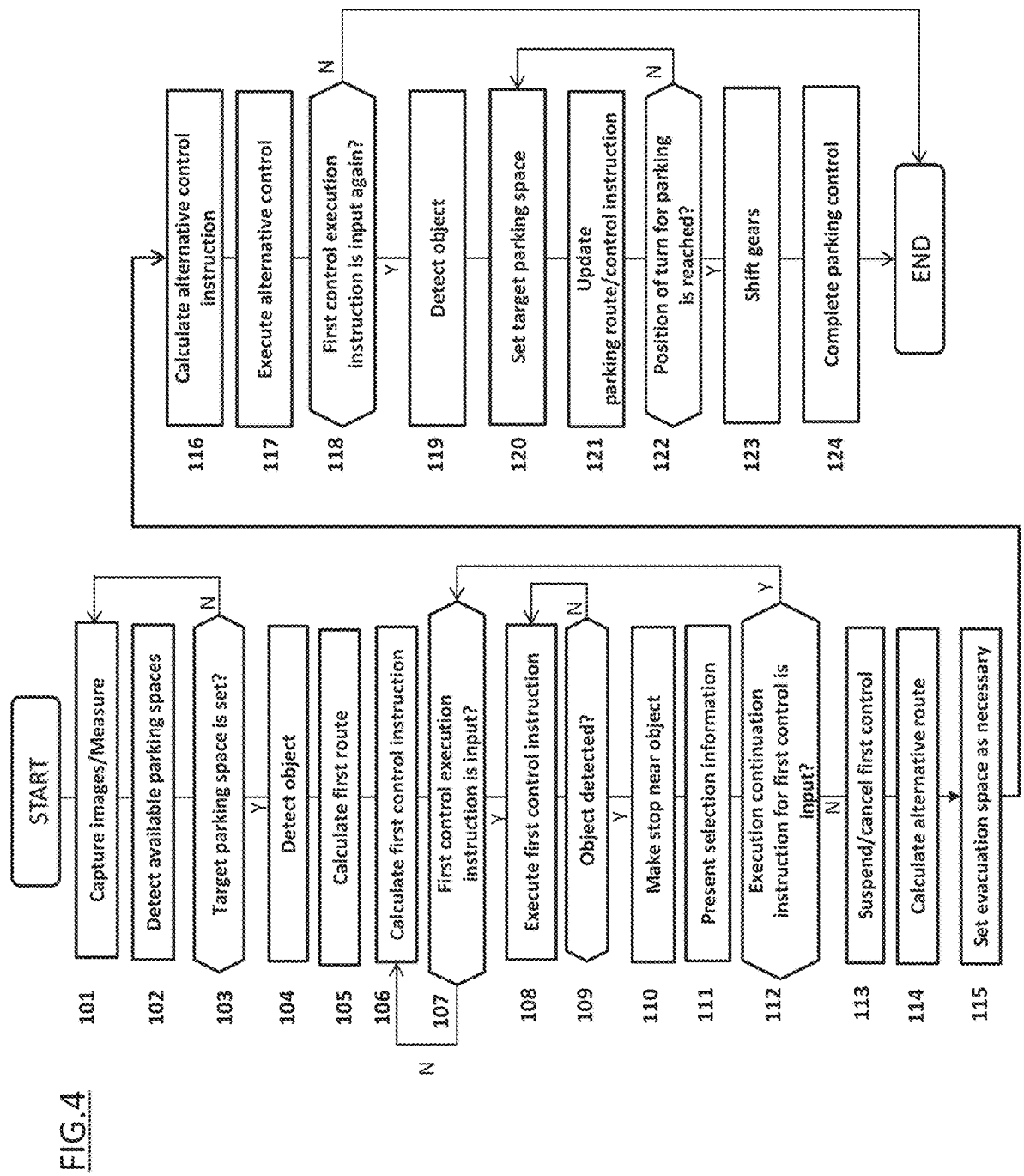
FIG. 4 is a flowchart illustrating an example of a control procedure executed by the parking control system according to one or more embodiments of the present invention.

FIG. 4 is a flowchart illustrating the control procedure of the parking control process executed by the parking control system 1000 according to one or more embodiments of the present invention. The trigger for starting the parking control process is not particularly limited, and the parking control process may be triggered by the operation of a start switch of the parking control apparatus 100.

The parking control apparatus 100 according to one or more embodiments of the present invention has a function of moving the vehicle V as the target of control in an autonomous manner to a parking space on the basis of the operation command acquired from outside of the vehicle.

In step 101, the control device 10 of the parking control apparatus 100 acquires information around the vehicle at a predetermined cycle. The process of acquiring the ranging signals and the process of acquiring the captured images may be selectively executed. The control device 10 acquires the ranging signals, as necessary, from the ranging devices 2 which are attached to multiple sites of the vehicle V. The control device 10 acquires the images, as necessary, which are captured by the cameras 1a to 1d attached to multiple sites of the vehicle V. Although not particularly limited, the camera 1a is disposed on the front grille part of the vehicle V, the camera 1d is disposed in the vicinity of the rear bumper, and the cameras 1b and 1c are disposed on the lower parts of the right and left door mirrors. A camera having a wide-angle lens with a wide view angle can be used as each of the cameras 1a to 1d. The cameras 1a to 1d capture images of boundary lines of parking spaces around the vehicle V and objects existing around the parking spaces. The cameras 1a to 1d may be CCD cameras, infrared cameras, or other appropriate imaging devices.

In step 102, the control device 10 detects parking spaces into which parking is possible. The control device 10 detects frames (areas) of parking spaces on the basis of the images captured by the cameras 1a to 1d. The control device 10 detects empty parking spaces using the detection data from the ranging devices 2 and the detection data extracted from the captured images. The control device 10 detects available parking spaces from among the parking spaces. The available parking spaces are parking spaces which are empty (i.e., other vehicles are not parked) and to which routes for completing the parking can be calculated. The target parking space for parking the vehicle is specified from among the available parking spaces. In one or more embodiments of the present invention, the condition that a parking route can be calculated means that a trajectory of the route from the current position to a target parking position can be rendered on the road surface coordinates without interfering with objects (including parked vehicles).

In step 103, the control device 10 transmits the available parking spaces to the operation terminal 5, controls the display 53 to display the available parking spaces, and requests the operator M to input selection information of the target parking position for parking the vehicle V. The target parking position may be automatically selected by the control device 10 or the parking facility side. When the operation command of specifying a parking space is input to the operation terminal 5, the parking space is set as the target parking position.

In step 104, the control device 10 detects an object using the previously described scheme. Objects include pedestrians, traffic signs, road structures, cargoes, movable objects, structures that form parking spaces, curbstones that partition parking spaces, etc. Structures that form parking spaces are buildings that constitute garages, carports, and the like. The detection of objects includes the detection of obstacles that obstruct the execution of the parking control.

In step 105, the control device 10 calculates a first route to the target parking space. Any scheme known at the time of filing the present application may be used for the process of calculating the first route to the target parking space.

In step 106, the control device 10 generates a first control instruction for moving the vehicle V1 along the calculated first route. The control device 10 preliminarily stores the spec information of the vehicle V1 necessary for the control instruction. Examples of the first control instruction include operation instructions for the steering amount, steering speed, steering acceleration, shift position, speed (including zero), acceleration, and deceleration of the vehicle V1, which are associated with the timing or position when the vehicle V1 travels along the parking route, and other operation instructions. The first control instruction includes the execution timing or execution position of the above operation instruction for the vehicle V1. The instruction regarding the parking route and the operation instruction associated with the parking route are executed by the vehicle V1, and the vehicle V1 can thereby be moved (parked) to the target parking position.

In step 107, the control device 10 receives an input of an execution instruction of the first control instruction from the operator M. When the execution instruction is input, the process proceeds to step 108, in which execution of the first control instruction is started. The execution instruction may be an input to a deadman switch of the operation terminal 5. The deadman switch is a switch having a function of continuing execution of the parking control process only while the operator M applies force to the switch and a function of suspending or canceling the execution of the parking control process when the force applied to the switch is removed. While the deadman switch of the operation terminal 5 is pressed/touched, the parking control process is continuously executed.

For confirmation of the surroundings of the vehicle V1, the display 53 of the operation terminal 5 displays an image obtained by viewpoint-converting a captured image representing the situation around the vehicle V1 into a bird's-eye image observed from a viewpoint above. The display may also display the position of the operator M. A display example is illustrated in FIG. 7A. As illustrated in the figure, the display 53 displays a "GO" button that serves as a deadman switch. The parking control process is continuously executed while the "GO" button is being touched (pressed).

In step 109, after starting the execution of the first control instruction, the control device 10 detects the change in a parking environmental factor that includes the detection of an object. Even after the parking control (first control) for the vehicle V1 is started, the parking environmental factor including the detection result of an object changes every moment. Objects include a two-dimensional indication object such as a parking space. A pedestrian (object) may newly appear with the passage of time, an object that was not able to be detected can be detected due to a change in the position of the vehicle V1, or the position and/or size of a parking space may change.

For example, a bumper or the like of another vehicle parked is formed with a curved surface, so it may not be possible to receive reflected waves from the other vehicle irradiated with radar during approach to the other vehicle. Thus, it may not be possible to detect the presence of another vehicle. On the other hand, after the turn for parking, the positional relationship between the other vehicle and the subject vehicle changes, so it may be possible to receive the reflected waves from the other vehicle irradiated with radar and detect the presence of the other vehicle. That is, when the vehicle V1 is controlled to move straight ahead along a parking route for right-angle parking and then turn for parking and travel along the parking route (first route) for entering the parking space while moving back, a determination may be made that "another vehicle is present," at the position of turn for parking or at the time of moving back even though a determination has been made that "another vehicle is not present" at the time of starting the parking control or moving straight ahead. In such a case, a determination is made that the parking environmental factor including the detection result of an object has changed.

The parking environmental factor refers to an environmental factor around the vehicle to be parked (vehicle to be controlled) that affects whether or not the execution of the parking control is possible. Environmental factors that affect the parking control include the presence/absence/position of another vehicle around the vehicle to be parked, the position/size of a parking space, and other similar factors. Examples of the change in the parking environmental factor include a situation in which an object has been newly detected, a change in the position, shape, size, or attribute of an object that has been detected, and a change in the position, shape, size, height, or attribute of a parking space that has been detected. The attributes of a parking space include parking forms such as parallel parking, right-angle parking, and angled-parking. The attributes of an object include a determination as to whether the object is a stationary object, the object is a moving object, the object is a pedestrian, the object is an adult, the object is a child, the object is garbage, the object is a road structure, or the object is a natural object. Road structures include two-dimensional or three-dimensional traffic signs.

Although not particularly limited, the change in the parking environmental factor is a result of the comparison between a first parking environment at first timing as a reference and a second parking environmental factor at second timing after the first timing. The first timing may be timing when the execution of the first control instruction is started (including the timing immediately before or after the start). Alternatively, the first timing may be timing when the parking environmental factor used for calculating the first route is acquired. Specifically, upon the comparison between the first parking environmental factor for the vehicle detected before starting the execution of the first control instruction and the second parking environmental factor for the vehicle detected after starting the execution of the first control instruction, when the amount of change between a first evaluation value of the first parking environmental factor and a second evaluation value of the second parking environmental factor is not less than a predetermined value, the control device 10 determines that there is a change in the parking environmental factor. When an object that was not detected is detected after starting the execution of the first control instruction, a determination is made that the parking environmental factor has changed or there is a change in the parking environmental factor.

By quantitatively determining whether or not there is a change in the parking environmental factor on the basis of the amount of change between the first evaluation value of the first parking environmental factor and the second evaluation value of the second parking environmental factor, the timing of an inquiry about the execution of the second control can be determined accurately and appropriately.

The evaluation that an object has been newly detected is performed as follows. Whether or not there is a change in the parking environmental factor may be determined on the basis of whether or not a predetermined condition is satisfied. The control device 10 defines as "zero" the first evaluation value that an object is not detected at the first timing, defines as "1" the second evaluation value that an object is detected at the second timing, and employs the difference value between the evaluation values as an amount of change in the evaluation value. The control device 10 defines the predetermined condition as the amount of change being equal to or more than a predetermined value "1" and determines that the parking environmental factor satisfies the predetermined condition on the basis of the difference value between the evaluation values being "1."

The evaluation of a change in the detection result represented by a physical amount such as a coordinate value or a length is performed as follows. For a change in the position, shape, or size of an object that has been detected, the control device 10 calculates the amount of change in the evaluation value on the basis of the detected physical amount. The same applies to a change in the position, shape, or size of a parking space.

The evaluation of determination of an attribute based on the detection result is performed as follows. The attribute is determined on the basis of images captured by the cameras 1a to 1d. On the basis of the amount of a temporal change in the captured images, a determination is made as to whether the object is a stationary object or a moving object. The determination is made by pattern matching of an object extracted from the captured images.

The control device 10 can determine whether the object is a pedestrian, the object is garbage, or the object is a road structure. The control device 10 can determine whether the object is an adult pedestrian or the object is a child pedestrian on the basis of the pattern matching and size of the object extracted from the captured images.

The control device 10 can determine whether or not the detected pedestrian (object) is the operator M on the basis of the previously described position of the operator M. The determination result as to whether the detected object is the operator M, a pedestrian other than the operator M, or an object rather than a person is used for creation of selection information.

The "attributes" of objects include being an "obstacle" that obstructs the movement of the vehicle and being a "non-obstacle" that does not obstruct the movement of the vehicle. When an object satisfies a predetermined condition, the control device 10 can determine that the object is an obstacle or a non-obstacle. The control device 10 can define the predetermined condition as a condition for determining that an object detected after starting the execution of the first control instruction is a non-obstacle that does not obstruct the movement of the vehicle. Likewise, the control device 10 can determine that an object that does not satisfy the predetermined condition as an obstacle. The "non-obstacle" is an object that does not obstruct the travel of the vehicle V1, such as a moving object, an object having a height of 20 cm or less, an object having a height of 10 cm or less, garbage, a step having a level difference of 20 cm or less, a step having a level difference of 10 cm or less, a fallen leaf, or grass. The determination result as to whether the detected object is an obstacle or a non-obstacle is used for creation of selection information.

The "non-obstacle" in one or more embodiments of the present invention is an object that does not obstruct the travel of the vehicle V1, such as a moving object, an object having a height of 20 cm or less, an object having a height of 10 cm or less, garbage, a step having a level difference of 20 cm or less, a step having a level difference of 10 cm or less, a fallen leaf, or grass, as previously described. Even when an object that does not obstruct the travel is newly detected, a determination is made that there is no change in the parking environmental factor.

A moving object becomes absent on the first route over time and thus does not obstruct the movement of the vehicle V1. An object having a height of 20 cm or less, an object having a height of 10 cm or less, a step having a level difference of 20 cm or less, a step having a level difference of 10 cm or less, garbage, fallen leaves, grass, and the like also do not obstruct the movement of the vehicle V1. The height and size of an object can be determined on the basis of the captured images and the measurement results from the ranging devices 2. A shopping bag of polyethylene or the like provided in a supermarket or the like has an upper limit (e.g., about 40 cm×40 cm) in size and may move in various directions due to wind or the like. Although fallen leaves, grass, and the like are natural objects, their presence can be determined on the basis of features on an image or changes over time of the features, such as a color, a gathering form, and movement in different directions due to wind or the like. For the scheme of determining the attribute of an object, a known technique may be used, such as a pattern matching method based on the degree of coincidence of image features.

Evaluation of attribute changes based on the detection results is performed as follows. The control device 10 gives an evaluation value associated with the attribute. The attribute is determined on the basis of the difference between numerical values defined for each attribute or the difference between the absolute values.

In step 110, the control device 10 controls the vehicle V1 to make a stop when approaching an object within a predetermined distance. After the vehicle V1 makes a stop, in step 111, the control device 10 controls the display 53 of the operation terminal 5 to display the selection information and receives the selection input information from the operator M. In the process of presenting the selection information, when presenting information regarding an alternative route, calculation of the alternative route is conducted. Additionally or alternatively, the selection information of step 111 may be displayed on the display 53 of the operation terminal 5 when an object is detected in step 109.

The "selection information" in one or more embodiments of the present invention includes options of a first mode and a second mode. In the first mode, the execution of the first control instruction for moving the vehicle V1 along the first route to the target parking space is continued. In the second mode, the control device 10 is caused to execute an alternative control instruction for moving the vehicle V1 along an alternative route different from the first route. The alternative route includes a sub route to the target parking space and a second route for the vehicle V1 to leave from the target parking space. The selection information includes an option of a rescue mode for causing the control device 10 to execute a second control instruction for moving along the second route.

The second route is a route for the vehicle V1 to leave from the target parking space (a route for separating the vehicle V1 from the target parking space), (a route for making a space between the vehicle V1 and target parking space), (a route for making the vehicle V1 escape from the target parking space). The second route according to one or more embodiments of the present invention is used in a rescue mode (return mode) for return/recovery from the state in which the parking control is suspended/canceled. The rescue mode refers to a process that is executed as emergency avoidance when continuation of the parking control process is difficult and the movement to the target parking position is suspended/canceled. The rescue mode is a process of moving the subject vehicle V1 so as to make the subject vehicle V1 leave from the target parking space (so as to separate the subject vehicle V1 from the target parking space), (so that the subject vehicle V1 is/becomes distant from the target parking space), (so that the subject vehicle V1 escapes from the target parking space) which has been set before the execution of the rescue mode. The control device 10 may calculate a trajectory for avoiding an object that causes the movement to the target parking position to be suspended/canceled as the second route (route in the rescue mode). As will be understood, the second route may be the same as the first route to the target parking space, and the control device 10 may reverse the travel direction along the route to calculate the second route for moving the subject vehicle V1 in the opposite direction to the first route. The second route calculated in the rescue mode may be a trajectory for moving (returning) to the position at which the parking process was started.

When an object is detected after starting the execution of the first control instruction, not only the first route to the target parking space but also the second route for the vehicle V1 to leave from the target parking space is presented as information for the operator M, and the options for the operator M can therefore be increased.

In one or more embodiments of the present invention, the operation information is acquired from the operator M located outside the vehicle V1. The operator M located outside the vehicle V1 can determine the environment around the vehicle V1 from a different viewpoint than the cameras 1 and ranging devices 2 of the vehicle V1. By presenting the selection information to the operator M located outside the vehicle V1, appropriate control content can be executed.

In one or more embodiments of the present invention, the control device 10 calculates a recommendation level and changes the display form of the "selection information" in accordance with the recommendation level.

Specifically, when presenting the selection information to the operator M, the control device 10 calculates a first recommendation level of the first mode and a second recommendation level of the second mode in accordance with the attribute of the detected object. When the first recommendation level is a higher value than the second recommendation level, the control device 10 displays a first switch for receiving the selection of the first mode in an emphasized manner so as to be more conspicuous than a second switch for receiving the selection of the second mode. On the other hand, when the second recommendation level is a higher value than the first recommendation level, the control device 10 displays the second switch for receiving the selection of the second mode in an emphasized manner so as to be more conspicuous than the first switch for receiving the selection of the first mode.

When emphasizing any one of the first switch and the second switch, the display size, color, luminance, transparency, thickness and form of boundary lines (dashed lines, two-dot chain lines), and/or presence or absence of blinking of the first switch and the second switch are made different. When emphasizing the display of the first switch more than the display of the second switch, the display region (area) of the first switch may be made relatively larger than that of the second switch, the display region of the first switch and/or its frame line may be indicated by an advancing color such as red, solid line, orange, or yellow so as to be relatively conspicuous than those of the second switch, the frame line of the display region of the first switch may be indicated by a bold or double line so as to be relatively conspicuous than that of the second switch, or the display region of the first switch may be displayed with high luminance or in a blinking manner so as to be relatively conspicuous than that of the second switch.

In this case, the display region (area) of the second switch may be made relatively smaller than that of the first switch, the display region of the second switch and/or its frame line may be indicated by a retreating color such as blue, green, or bruise blue so as to be relatively inconspicuous than those of the first switch, the frame line of the display region of the second switch may be indicated by a thin or chain line so as to be relatively inconspicuous than that of the first switch, or the display region of the second switch may be displayed with low luminance or in a grayout manner so as to be relatively inconspicuous. In contrast, when emphasizing the display of the second switch more than the display of the first switch, the above-described scheme is used to make the display of the second switch relatively conspicuous and/or make the display of the first switch relatively inconspicuous.

Thus, by calculating the recommendation levels of the first mode and second mode in accordance with the attribute of the detected object and displaying the switch, which is used to select the mode with a higher recommendation level, so as to be relatively conspicuous, the selection operation of the operator M can be assisted to select a mode suitable for the presence of the detected object.

In the process of calculating the recommendation level according to one or more embodiments of the present invention, the control device 10 calculates the value of the second recommendation level as a higher value as the distance between the operator M and the vehicle V1 increases. As the operator M moves away from the vehicle V1, the reliability of determination made by the operator M on the environment around the vehicle V1 is liable to deteriorate. In one or more embodiments of the present invention, the value of the second recommendation level is calculated as a high value so that, when an object is detected, the second mode for executing the alternative control instruction for the vehicle to travel along the alternative route is more readily selected rather than continuing the first control. When the second recommendation level is calculated to be high, the second switch for selecting the second mode is displayed so as to be relatively conspicuous.

The "selection information" in one or more embodiments of the present invention can include information on the alternative route. The information on the alternative route includes the position and trajectory of the alternative route and the point of turn for parking on the alternative route. By displaying such information on the display 53 of the operation terminal 5, it is possible to assist the operator M to make a selection determination.

The "selection information" in one or more embodiments of the present invention can include the number of turns for parking on the alternative route. By displaying the number of turns for parking on the alternative route on the display 53 of the operation terminal 5, it is possible to assist the operator M to make a selection determination.

The "selection information" in one or more embodiments of the present invention can include a travel stop position on the alternative route. The travel stop position is a place at which the vehicle can reach along the alternative route. When the target parking space cannot be reached along the alternative route, the travel stop position can be presented as the selection information to inform the operator M of a point at which the vehicle can reach. By displaying the travel stop position on the alternative route on the display 53 of the operation terminal 5, it is possible to assist the operator M to make a selection determination. The travel stop position may coincide with the evacuation space.

In step 112, the control device 10 receives the selection input information which is input by the operator M for the presented selection information. When the execution continuation instruction for the first control instruction is input from the operator M, the process returns to step 107, from which the processes of step 108 and subsequent steps are continued.

FIG. 5 illustrates a subroutine of step 111 of FIG. 4. In step 201, the control device 10 displays a switch for selecting continuation of the first control instruction or switching to the alternative control as the selection information. In step 202, the alternative route is further displayed as the selection information. At this time, in step 203, the stop position on the alternative route may be presented as the selection information. In step 204, one or more positions of turns for parking on the alternative route and the number of turns for parking may be displayed as the selection information. In step 205, an indication as to whether the alternative route is the route to the target parking space or the second route may be included as the selection information. The first route is an optimal route to the target parking space. The alternative route includes a route that passes through a different point than the first route to the target parking space and a route for moving to an evacuation space different than the target parking space. Due to the presence of a new object or a change in the detection result, a route for moving to the target parking space may not be derived or the number of turns for paring may exceed an allowable number. In this case, the second route is calculated to temporarily evacuate the vehicle V1 rather than heading to the target parking space. The vehicle is moved along the second route thereby to leave from the target parking space and, thereafter, movement to the target parking space (parking into the target parking space) can be tried again.

FIG. 6 illustrates a subroutine of steps 111 to 117 of FIG. 4. After an object is detected in step 109 of FIG. 4 and the vehicle is controlled to make a stop in step 110, a process of presenting the selection information is executed.

In step 301 of FIG. 6, the control device 10 determines the attribute of the object. The previously described scheme is used as the scheme of determining the attribute of the object. The result of attribute determination is used for the calculation of the recommendation level.

When the object can be removed from the first route, the control device 10 determines that continuing the first control is the recommended control.

In step 302, the first recommendation level of the first control and the second recommendation level of the alternative control are calculated in accordance with the attribute. Addition/subtraction of a reference value that is preliminarily set is performed. An example of the addition/subtraction for the recommendation level will be described below. When correcting the recommendation level to a higher value, on the assumption that the reference value is set to 1, a positive numerical value may be added or a coefficient Q (Q>1) may be multiplied. When correcting the recommendation level to a lower value, on the assumption that the reference value is set to 1, a positive numerical value may be subtracted or a coefficient Q (0<Q<1) may be multiplied.

Examples of calculation of the recommendation level will be described below.

(1) When the detected object is the operator M, it is preferred to continue the first control rather than suspending/canceling the first control because the operator M pays attention to the movement of the vehicle V1. The first recommendation level of the first control is therefore calculated as a value higher than the reference value. Although not particularly limited, when the position of the detected object coincides with the position of the operator M (or the operation terminal 5), a determination is made that the detected object is the operator M.

(2) When the detected object is a pedestrian, it is preferred to stop the first control and execute the alternative control for moving along the alternative route rather than continuing the first control as in the above (1) because the pedestrian may walk around the route. The second recommendation level of the second control is therefore set to a relatively higher value than that in the above (1). The coefficient Q when obtaining the second recommendation level is set to a higher value than the coefficient Q in the above (1), or the coefficient Q when obtaining the first recommendation level is set to a lower value than the coefficient Q in the above (1). Although not particularly limited, when a characteristic movement of a terminal part (limb) can be extracted from temporally captured images of the detected object, a determination is made that the object is a pedestrian.

(3) When the detected object is an obstacle, it is preferred to put importance on a determination made by of the operator M rather than recommending any one of the first mode and the second mode. The first recommendation level of the first control and the second recommendation level of the second control are therefore set to the same value. Although not particularly limited, a determination is made as to whether the object is a stationary object or a moving object on the basis of a temporal position change in the captured images of the detected object. The scheme of determining the attribute of the object is not particularly limited, and the determination can be made using a scheme known at the time of filing the present application.

In step 303, the control device 10 controls the display 53 of the operation terminal 5 to display the selection information in accordance with the values of the first recommendation level and second recommendation level.

Figure 7B:
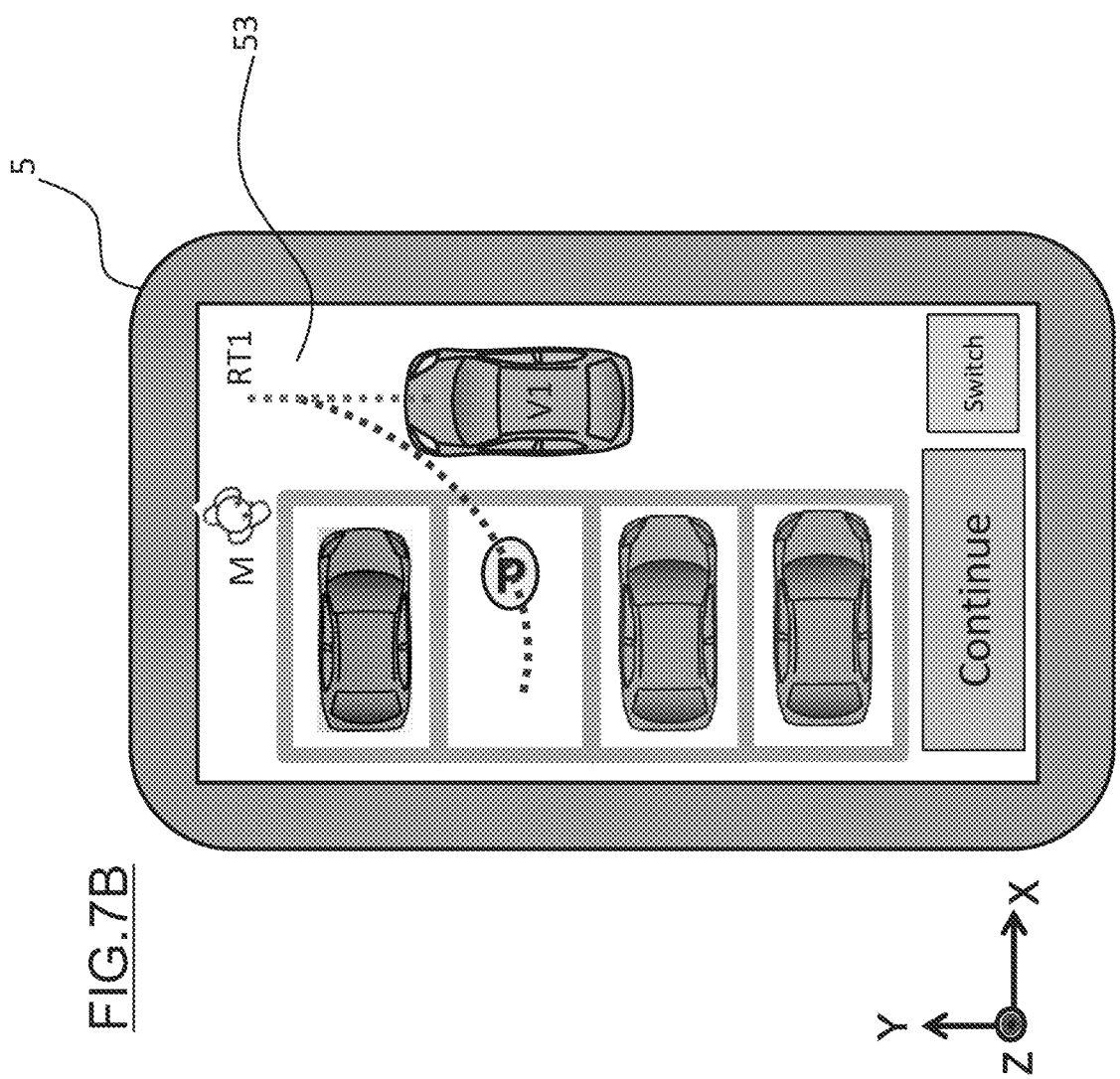
FIG. 7B is a second diagram for describing the first presentation process for selection information.

At the time of starting the parking control, the operator M touches or presses the "GO" switch illustrated in FIG. 7A thereby to instruct to start the parking control. When an object is then detected, the control device 10 decelerates or stops the vehicle to suspend or cancel the execution of the first control instruction. When the first recommendation level is a higher value than the second recommendation level in step 302, as illustrated in FIG. 7B, in step 303, "Continue (continuation)" which is the first switch for inputting the continuation command for the first control instruction is displayed larger so as to be relatively conspicuous than "Switch (switching)" which is the second switch. In the scene illustrated in FIG. 7B, the operator M is located at a position separated from the first route RT1 and no other obstacles are present, so the first recommendation level is a higher value than the second recommendation level. On the other hand, when the second recommendation level is a higher value than the first recommendation level, as illustrated in FIG. 7C, in step 303, "Switch (switching)" which is the second switch for inputting the switching command to the alternative control is displayed larger so as to be relatively conspicuous than "Continue (continuation)" which is the first switch. In the scene illustrated in FIG. 7C, another vehicle is present near the first route RT1, and the second recommendation level is a higher value than the first recommendation level.

In step 304, the control device 10 waits for input of the selection input information. The control device 10 confirms the input of a first control continuation instruction. The input information of the first control continuation instruction may be input by touching the first switch which receives selection of the first mode. Additionally or alternatively, in a case in which the first recommendation level is higher than the second recommendation level, a determination that the selection input instruction for the first recommendation level is input may be made when some acceptance operation/acceptance action is performed. The acceptance operation/acceptance action may be an act of operating a main switch such as a start button, shaking the operation terminal 5 right and left or up and down, hitting the operation terminal 5, or tapping or swiping the display 53. For example, when the control device 10 determines that the recommendation level of the first mode is relatively higher, and the operator M performs an operation of swinging down the operation terminal 5, a determination is made that the operator M selects the first mode.

Not only the active selection operation as described above but also an inactive selection operation may be preliminarily defined. In such an inactive selection operation, when the control device 10 determines a mode having a higher recommendation level between the first control and the alternative control and there is no input to the operation terminal 5 for a predetermined time, the control device 10 selects the mode having the higher recommendation level. For example, when the operator M does not perform any operation within a predetermined time after the control device 10 determines that the recommendation level of the first mode is relatively high, the control device 10 determines that the operator M selects the first mode.

In step 305, when the first control continuation instruction is input in step 304, the control device 10 determines whether or not the detected object is a non-obstacle (object that does not obstruct the travel of the vehicle). In one or more embodiments of the present invention, this is a situation in which when the object is detected after the start of the parking control, the operator M inputs the first control continuation instruction and continues the first control to move the vehicle V1 along the first route while checking the object. When the object is an obstacle, it is highly possible that the alternative control for moving along the alternative route is selected. When the object is a non-obstacle, it is highly possible that the operator M continues the first control. Accordingly, apart from the process of determining the attribute of the object in step 302, the process of determining the attribute of the object is performed in step 305. The control device 10 first evaluates an object, such as a pedestrian or the operator M, who leaves the route by autonomous walking, and then determines whether or not the detected object is a non-obstacle that does not obstruct the movement of the vehicle V1. When the object is a movable object (when the object can be removed/taken away), the object is a non-obstacle.

The control device 10 determines the attribute of the object. When the object has any of the following attributes, a determination is made that the object is a movable object that may leave the first route. When the detected object is a movable object, a determination is made that the object is a non-obstacle.

(1) A case in which the detected object is the operator M
(2) A case in which the detected object is a moving object (3) A case in which the detected object is a pedestrian The determination in step 305 that the object is a non-obstacle is followed by step 306. In step 306, the control device 10 calculates the first recommendation level as a relatively high value and determines the recommendation level of the first mode in which the first control is continued. Thereafter, the process proceeds to step 307, in which the first switch for selecting the first mode is displayed in an emphasized manner. The determination in step 305 that the object is an obstacle is followed by step 308. In step 308, the control device 10 calculates the first recommendation level as a relatively low value or calculates the second recommendation level as a relatively high value, cancels the first control, and determines the recommendation level of the second mode for traveling along the alternative route. Thereafter, the process proceeds to step 309, in which the second switch for selecting the second mode is displayed in an emphasized manner.

Figure 8A:
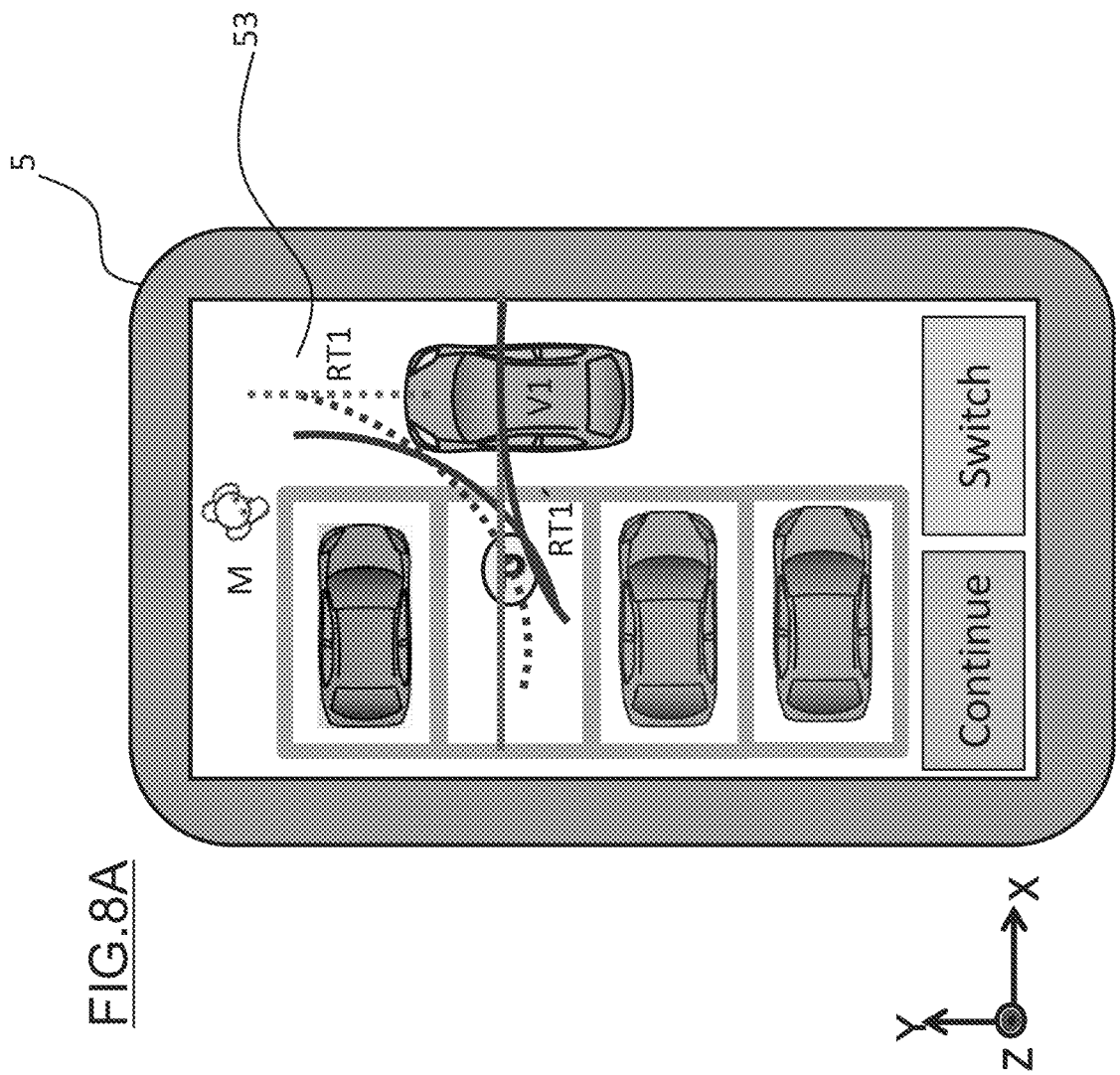
FIG. 8A is a first diagram for describing a second presentation process for selection information.

As illustrated in FIG. 8A, the "selection information" in one or more embodiments of the present invention can include an alternative route RT1' in addition to the first route RT1. The position and trajectory of the alternative route RT1' can be displayed on the display 53 of the operation terminal 5. In addition, as illustrated in FIG. 8B, a notice regarding the route may be displayed. In the example illustrated in FIG. 8B, to inform that the first route includes a narrow route, a text is displayed as follows: "Vehicle may pass through narrow route to continue parking control. Parking control will be continued if your visual confirmation allows for stop control."

As illustrated in FIG. 9A, the "selection information" in one or more embodiments of the present invention can include the number of turns for parking on the alternative route RT'. The number of turns for parking on the alternative route can be displayed on the display 53 of the operation terminal 5. In the example illustrated in FIG. 9A, it is recommended to switch to the alternative route RT' on which the number of turns for parking is two, and the second switch "Switch" is displayed in an emphasized manner so as to be more conspicuous than the first switch "Cont." In addition, as illustrated in FIG. 9B, a notice regarding the alternative route may be displayed. In the example illustrated in FIG. 9B, to guide the number of turns for parking on the alternative route, a text is displayed as follows: "Selection of switch mode allows for parking with increased number of turns of two."

Figure 10A:
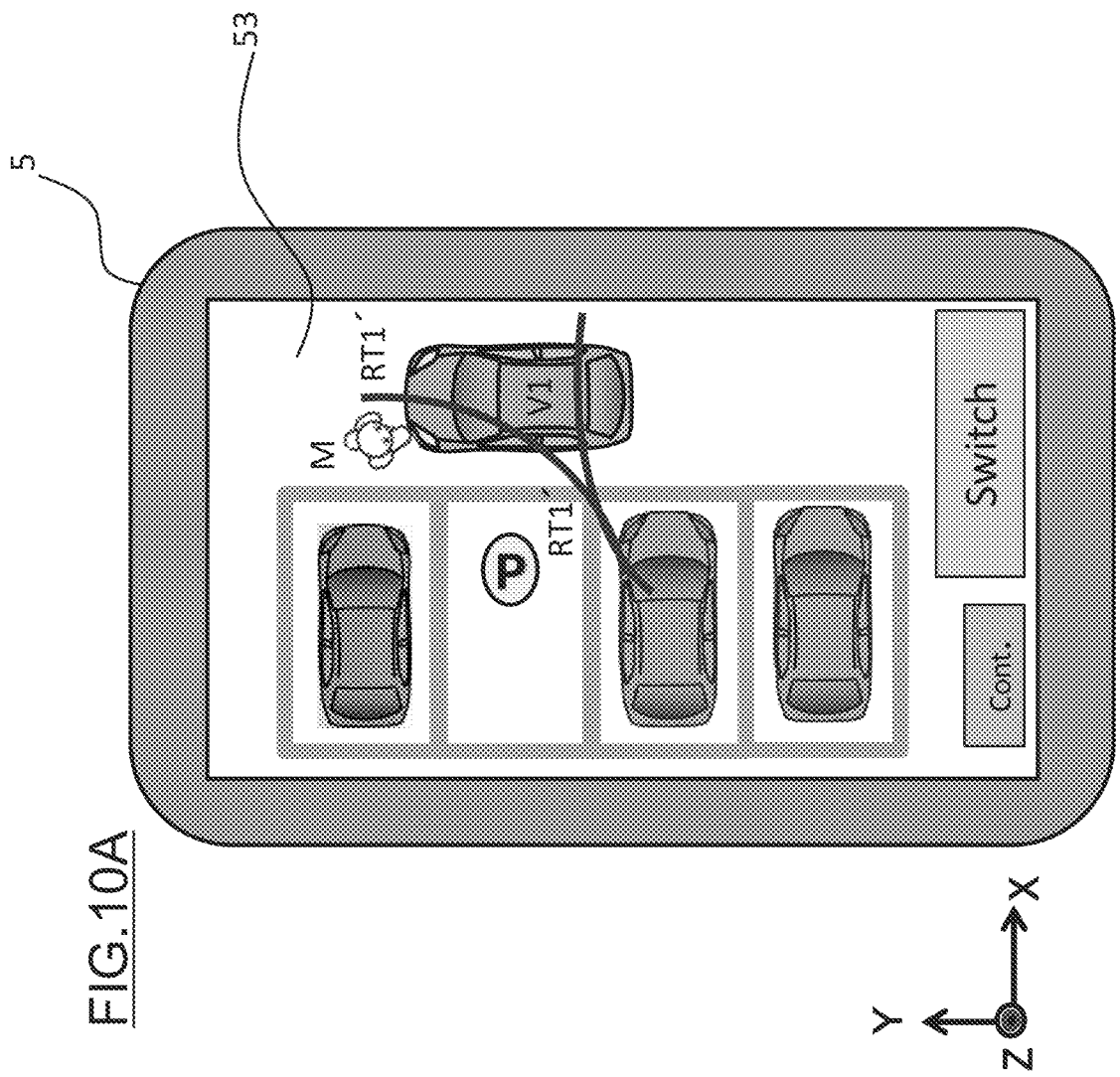
FIG. 10A is a first diagram for describing a fourth presentation process for selection information.

As illustrated in FIG. 10A, the "selection information" in one or more embodiments of the present invention can include the travel stop position on the alternative route. The travel stop position refers to a position to which the vehicle can finally travel when the parking target space cannot be reached. The end part of the alternative route RT' is the travel stop position. This selection information allows the operator M to understand that the alternative route RT' is a route along which the target parking space cannot be reached. In the example illustrated in FIG. 10B, to explain the alternative route RT', a text is displayed as follows: "Selection of switch mode tries to park along route including turn for parking. Target parking space may not be reached." By displaying the travel stop position, which is a place that can be reached along the alternative route RT', on the display 53 of the operation terminal 5, it is possible to assist the operator M to make a selection determination.

As illustrated in FIG. 11A, the "selection information" in one or more embodiments of the present invention can include an option of the rescue mode. A third switch "Rescue" is displayed for selecting the rescue mode for moving the vehicle V1 to the evacuation space rather than continuing the first control instruction or switching to the alternative control. FIG. 11B illustrates an example in which the second control (rescue mode) is associated with the previously described second switch. FIG. 11A illustrates an example of the selection information in which a dedicated switch (Rescue) is provided to select the second control (rescue mode) for the vehicle V1 to leave from the target parking space, while FIG. 11B illustrates an example of the selection information which includes the first switch for the first mode for moving the vehicle to the target parking space and the second switch for the second mode including control for moving the vehicle to the target parking space along the alternative route and control for moving the vehicle to the evacuation space along the alternative route.

In step 310, for the selection information in which the recommended mode in step 306 or 308 is displayed in an emphasized manner, the control device 10 confirms the selection or acceptance made by the operator M. The input information of selection is determined in accordance with the operation of the first switch or the second switch. The input information of acceptance may be acquired by an active input operation such as touching the switch displayed on the display 53 or shaking the operation terminal 5 or may also be acquired by an inactive acceptance input of inputting nothing for a predetermined time for the presentation of the selection information in which the recommended mode is displayed in an emphasized manner.

Step 310 is followed by step 311, in which the control device 10 confirms that the object has moved from the route. After confirming that no object is present, the process proceeds to step 312. In step 312, the control device 10 continues to execute the control instruction in the selected mode.

When the control device 10 confirms that the object is present without moving from the route, the process proceeds to step 313. In step 313, the control device 10 determines whether or not an alternative route to the target parking space can be calculated with a turn for parking. The route may be calculated using a scheme known at the time of filing the present application. When a route to the target parking space is calculated with a predetermined number or less of turns for parking, the process proceeds to step 314, in which the vehicle is moved to the target parking space along the alternative route.

In step 313, when a route to the target parking space cannot be calculated with the predetermined number or less of turns for parking, the control device 10 calculates an alternative route, that is, the second route for to leave from the target parking space. The second route is a route to an evacuation space at a position different from the target parking space. The control device 10 controls the vehicle V1 to move along the second route (alternate route).

Thus, for an object that is newly detected after starting the movement to the target parking space, the selection information is presented to the operator M on the basis of the recommendation level in accordance with the attribute of the object and it is therefore possible to execute the control content along the intention of the operator M while reducing the determination load of the operator M. In the remote parking, communication between the vehicle V1 and the operator M through information exchange between the control device 10 and the operation terminal 5 is important, such as information exchange between the determination on the vehicle side and the operator M and confirmation of the determination. If all the determinations are left to the operator M and the control content for the vehicle V1 is determined on the basis only of the intention of the operator M, the determination load of the operator M increases, and the visual field and visual recognition ability of the operator M are limited. On the basis of the recommendation level, the control device 10 of the vehicle V presents the operator M with the selection information, which assists the operator M to make a determination, while taking into account the intention of the operator M, and it is therefore possible to determine and execute the appropriate control content in which the determination on the vehicle side and the intention of the operator M are reflected.

Referring again to FIG. 4, after the control device 10 executes the process of step 111, when the execution continuation instruction for the first control instruction is not input in step 112 for the presented selection information, that is, when the execution of the alternative control instruction is requested, the process proceeds to step 113. On the other hand, when the execution continuation instruction for the first control instruction is input, the process returns to step 107.

In step 113, when the control device 10 suspends/cancels the execution of the first control instruction which is currently being executed, the process proceeds to step 114.

In step 114, the control device 10 calculates an alternative route. At this time, a change in the situation may be taken into account to newly calculate the alternative route, or the alternative route calculated in the presentation of the selection information may also be used.

Step 115 is a process that can be performed parallel to step 114 or before or after step 114. In step 115, the control device 10 may set an evacuation space as necessary and calculate an alternative route to the evacuation space. Also when the vehicle V1 is controlled to move along the second route for leaving from the target parking space, an evacuation space may be set and the second route to the evacuation space may be calculated.

Step 115 is followed by step 116, in which the control device 10 generates an alternative control instruction for moving the vehicle V1 along the calculated alternative route. The alternative control instruction includes a second route to the evacuation space. The control device 10 preliminarily stores the spec information of the vehicle V1 necessary for calculation of the alternative control instruction. Examples of the alternative control instruction include operation instructions for the steering amount, steering speed, steering acceleration, shift position, speed (including zero), acceleration, and deceleration of the vehicle V1, which are associated with the timing or position when the vehicle V1 travels along the parking route, and other operation instructions.

In step 117, the control device 10 executes the alternative control instruction. The alternative control instruction includes the execution timing or execution position of the above operation instruction for the vehicle V1. The instruction regarding the parking route and the operation instruction associated with the parking route are executed by the vehicle V1, and the vehicle V1 can thereby be moved (parked) to the target parking position. When the execution command for the alternative control is input, the control device 10 executes a process of moving the vehicle V1 along the alternative route for leaving from the target parking space.

The alternative control for moving the vehicle V1 along the alternative route includes the second control for the vehicle to leave from the target parking space. The control device 10 executes the second control on the basis of the second control instruction. When the execution command for the second control is input from the operator M, the control device 10 according to one or more embodiments of the present invention suspends or cancels the execution of the first control instruction, calculates the second route for the vehicle V1 to leave from the target parking space, generates or acquires the second control instruction for moving the vehicle along the second route, and executes the second control instruction. Thus, when the parking environmental factor changes, such as when an object is newly detected, the second control instruction (rescue mode) can be promptly executed in accordance with the intention of the operator M. After the second control is completed, the vehicle V1 is controlled to move to the evacuation space. The evacuation space is not a parking space and it is therefore necessary to move the vehicle V1 to a parking space.

In step 118, when the execution instruction for the first control instruction for moving the vehicle to the target parking space is input again, the processes of step 119 and subsequent steps are performed to move the vehicle to the target parking space again. This is because the vehicle V1 may not be able to move to the target parking space even after the execution of the alternative control instruction. When the vehicle V1 can move to the target parking space by the execution of the alternative control instruction, the execution instruction for the first control instruction is not input, so the parking control process is concluded.

In step 119, the control device 10 detects objects around the vehicle V1. This is because an object may newly approach. In step 120, the control device 10 sets a target parking space again. The same parking space as the target parking space set in step 103 may be set. In step 121, the control device 10 calculates the parking route (first route) to the target parking space. The parking route includes a position of turn for parking necessary for moving to the parking space. For this operation, the parking route is defined as a line and is also defined as a strip-shaped area corresponding to the occupied area by the vehicle V1 based on the vehicle width. The occupied area by the vehicle V1 is defined with consideration for the vehicle width and a margin width ensured for movement. The control device 10 confirms that no objects are detected within the occupied area.

In step 121, the control device 10 generates a control instruction for moving the vehicle V1 along the calculated parking route. The control device 10 preliminarily stores the spec information of the vehicle V1 necessary for the control instruction. Examples of the control instruction include operation instructions for the steering amount, steering speed, steering acceleration, shift position, speed (including zero), acceleration, and deceleration of the vehicle V1, which are associated with the timing or position when the vehicle V1 travels along the parking route, and other operation instructions. The control instruction includes the execution timing or execution position of the above operation instruction for the vehicle V1. The instruction regarding the parking route and the operation instruction associated with the parking route are executed by the vehicle V1, and the vehicle V1 can thereby be moved (parked) to the target parking position. The control instruction according to one or more embodiments of the present invention includes a stop instruction for the vehicle V1 at the second position. Additionally or alternatively, the control instruction may include an operation of opening a door of the vehicle V1 at the second position.

In step 122, the control device 10 monitors the change in the environment around the vehicle V1, such as the appearance of an object, until the vehicle V1 reaches the position of turn for parking. When the vehicle V1 reaches the position of turn for parking, the gear shift included in the control instruction is executed in step 123. Step 123 is followed by step 124, in which the parking control is completed by sequentially executing control instructions.

The parking control apparatus 100 according to one or more embodiments of the present invention controls the operation of the drive system 40 via the vehicle controller 70 in accordance with the control instruction so that the vehicle V1 moves along the parking route (examples of the parking route include the first route, the alternative route, and the second route). The parking control apparatus 100 calculates command signals to the drive system 40 of the vehicle V1, such as an EPS motor, while feeding back the output value of the steering angle sensor 50 of the steering apparatus so that the travel trajectory of the vehicle V1 coincides with the calculated parking route, and transmits the command signals to the drive system 40 or to the vehicle controller 70 which controls the drive system 40.

The parking control apparatus 100 according to one or more embodiments of the present invention includes a control unit for parking control. The control unit for parking control acquires shift range information from an AT/CVT control unit, wheel speed information from an ABS control unit, steering angle information from a steering angle control unit, engine speed information from an ECM, and other necessary information. On the basis of these information items, the control unit for parking control calculates and outputs instruction information on the autonomous steering to the EPS control unit, instruction information such as warning to a meter control unit, etc. The control device 10 acquires information items, which are acquired by the steering angle sensor 50 of the steering apparatus of the vehicle V1, the vehicle speed sensor 60, and other sensors of the vehicle V1, via the vehicle controller 70.

The drive system 40 according to one or more embodiments of the present invention drives the vehicle V1 to move (travel) from the current position to the target parking position by driving based on the control command signals acquired from the parking control apparatus 100. The steering apparatus according to one or more embodiments of the present invention is a drive mechanism that moves the vehicle V1 in the right and left directions. The EPS motor included in the drive system 40 drives the power steering mechanism of the steering of the steering apparatus on the basis of the control command signals acquired from the parking control apparatus 100 to control the steering amount and controls the operation when moving the vehicle V1 to the target parking position. The control content and operation scheme for parking of the vehicle V1 are not particularly limited, and any scheme known at the time of filing the present application can be appropriately applied.

When the parking control apparatus 100 according to one or more embodiments of the present invention controls the vehicle V1 to move to the target parking position along the route calculated on the basis of the position of the vehicle V1 and the position of the target parking position, the accelerator and the brake are controlled in an autonomous manner on the basis of the designated control vehicle speed (set vehicle speed), and the operation of the steering apparatus controls the movement of the vehicle V1 in an autonomous manner in accordance with the vehicle speed.

In one or more embodiments of the present invention, the processes after the detection of an object are focused on, so an example of the process has been described in which the parking control of step 108 is suspended/canceled, but when no objects are detected, the parking control process is executed in step 108 in accordance with the above-described principle.

The parking control method according to one or more embodiments of the present invention is used in the parking control apparatus as the above and therefore exhibits the following effects. The parking control apparatus 100 according to one or more embodiments of the present invention is configured and operates as the above and therefore exhibits the following effects.

(1) In the parking control method according to one or more embodiments of the present invention, when an object is detected, the control instruction being executed is continued or the alternative control instruction for moving the vehicle along the alternative route is executed on the basis of the selection input from the operator M, and the parking process can therefore be executed in accordance with the intention of the operator M without unexceptionally stopping the vehicle.

For an object that is newly detected after starting the movement to the target parking space, the selection information is presented to the operator M in accordance with the attribute of the object and it is therefore possible to execute the control content along the intention of the operator M while reducing the determination load of the operator M. Particularly in the remote parking, communication is important, such as information exchange between the determination on the vehicle side and the operator M and confirmation of the determination. If all the determinations are left to the operator M and the control content for the vehicle V1 is determined on the basis only of the intention of the operator M, the determination load of the operator M increases. Moreover, the visual field and visual recognition ability of the operator M are limited, and the determination made by the operator M may be inaccurate. Rather, the onboard cameras may readily detect the presence of an object. On the basis of the recommendation level in accordance with the attribute of an object, the control device 10 of the vehicle V1 presents the operator M with the selection information which can assist the operator M to make a determination, and it is therefore possible to determine the appropriate control content in which the determination on the vehicle side and the intention of the operator M are reflected.

(2) In the parking control method according to one or more embodiments of the present invention, when presenting the selection information to the operator M, the control device 10 calculates a first recommendation level of the first mode and a second recommendation level of the second mode in accordance with the attribute of the detected object. When the first recommendation level is a higher value than the second recommendation level, the control device 10 displays a first switch for receiving the selection of the first mode in an emphasized manner so as to be more conspicuous than a second switch for receiving the selection of the second mode. On the other hand, when the second recommendation level is a higher value than the first recommendation level, the control device 10 displays the second switch for receiving the selection of the second mode in an emphasized manner so as to be more conspicuous than the first switch for receiving the selection of the first mode. By calculating the recommendation levels of the first mode and second mode in accordance with the attribute of the detected object and displaying the switch, which is used to select the mode with a higher recommendation level, so as to be relatively conspicuous, the selection operation of the operator M can be assisted to select a mode suitable for the presence of the detected object.

(3) In the parking control method according to one or more embodiments of the present invention, the control device 10 calculates the value of the second recommendation level as a higher value as the distance between the operator M and the vehicle V1 increases. As the operator M moves away from the vehicle V1, the reliability of determination made by the operator M on the environment around the vehicle V1 is liable to deteriorate. In one or more embodiments of the present invention, the value of the second recommendation level is calculated as a high value so that, when an object is detected, the second mode for executing the alternative control instruction for the vehicle to travel along the alternative route is more readily selected rather than continuing the first control. When the second recommendation level is calculated to be high, the second switch for selecting the second mode is displayed so as to be relatively conspicuous.

(4) In the parking control method according to one or more embodiments of the present invention, when an object is detected after starting the execution of the first control instruction, not only the first route to the target parking space but also the second route for the vehicle V1 to leave from the target parking space is presented as information for the operator M, and the options for the operator M can therefore be increased.

(5) In the parking control method according to one or more embodiments of the present invention, the "selection information" can include information on the alternative route. By displaying the position and trajectory of the alternative route on the display 53 of the operation terminal 5, it is possible to assist the operator M to make a selection determination.

(6) In the parking control method according to one or more embodiments of the present invention, the "selection information" can include the number of turns for parking on the alternative route. By displaying the number of turns for parking on the alternative route on the display 53 of the operation terminal 5, it is possible to assist the operator M to make a selection determination.

(7) In the parking control method according to one or more embodiments of the present invention, the "selection information" can include the travel stop position on the alternative route. By displaying the travel stop position on the alternative route on the display 53 of the operation terminal 5, it is possible to assist the operator M to make a selection determination.

(8) In the parking control method according to one or more embodiments of the present invention, the operation information is acquired from the operator M located outside the vehicle V1. The operator M located outside the vehicle V1 can determine the environment around the vehicle V1 from a different viewpoint than the cameras 1 and ranging devices 2 of the vehicle V1. By presenting the selection information to the operator M located outside the vehicle V1, appropriate control content can be executed.

(9) Also in the parking control apparatus 100 in which the method according to one or more embodiments of the present invention is executed, the actions and effects as described in the above (1) to (8) are exhibited.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1000 Parking control system
100 Parking control apparatus
10 Control device
11 CPU
12 ROM
13 RAM
132 Storage device
133 Map information
134 Parking lot information
135 Object information
20 Input device
21 Communication device
211 Antennas
30 Output device
31 Display
1a-1d Cameras
2 Ranging devices
3 Information server
31 Communication device
32 Storage device
33 Map information
34 Parking lot information
35 Object information
5 Operation terminal
51 Communication device
511 Antenna
52 Input device
53 Display
200 Onboard device
40 Drive system
50 Steering angle sensor
60 Vehicle speed sensor
70 Vehicle controller
V, V1 Vehicle

The invention claimed is:

1. A parking control method for calculating a first control instruction and causing a control device of a vehicle to execute the first control instruction on a basis of an operation command acquired from an operator, the first control instruction being for moving the vehicle along a first route to a target parking space, the parking control method comprising:

when detecting an obstacle object that obstructs movement of the vehicle on the first route after setting the target parking space and starting execution of the first control instruction for moving the vehicle along the first route to the set target parking space, setting an evacuation space, wherein the evacuation space is not a parking space;

calculating an alternative route for the vehicle to leave from a state in which the first control instruction is to be suspended or canceled and move away from the set target parking space to the evacuation space;

presenting the operator with selection information for selecting a first mode in which the execution of the first control instruction that is set is continued or a second mode in which the control device of the vehicle is caused to execute an alternative control instruction for moving the vehicle along the alternative route and stopping at the evacuation space, wherein the alternative route is different from the first route, and wherein the evacuation space is different from the set target parking space; and causing the control device to execute the first control instruction or the alternative control instruction in accordance with selection input information from the operator.

2. The parking control method according to claim 1, comprising:

upon presentation of the selection information to the operator, calculating a first recommendation level of the first mode and a second recommendation level of the second mode in accordance with an attribute of the detected obstacle object;

when the first recommendation level is a higher value than the second recommendation level, displaying a first switch for receiving selection of the first mode in a more emphasized manner than a second switch for receiving selection of the second mode; and when the second recommendation level is a higher value than the first recommendation level, displaying the second switch for receiving the selection of the second mode in a more emphasized manner than the first switch for receiving the selection of the first mode.

3. The parking control method according to claim 2, comprising calculating a value of the second recommendation level as a higher value as a distance between the operator and the vehicle increases.

4. The parking control method according to claim 1, wherein
the alternative route includes a route to the target parking space and a second route for the vehicle to leave from the target parking space, and
the selection information includes an option of a rescue mode for causing the control device to execute a second control instruction for moving along the second route.

5. The parking control method according to claim 1, wherein the selection information includes information on the alternative route.

6. The parking control method according to claim 1, wherein the selection information includes a number of turns for parking on the alternative route.

7. The parking control method according to claim 1, wherein the selection information includes a travel stop position on the alternative route.

8. The parking control method according to claim 1, wherein the operation command is acquired from the operator located outside the vehicle.

9. A parking control apparatus comprising a control device configured to execute a first control instruction for moving a vehicle along a first route to a target parking space, on a basis of an operation command acquired from an operator located outside the vehicle, the control device operating to:
when detecting an obstacle object that obstructs movement of the vehicle on the first route after setting the target parking space and starting execution of the first control instruction for moving the vehicle along the first route to the set target parking space, set an evacuation space, wherein the evacuation space is not a parking space;
calculate an alternative route for the vehicle to leave from a state in which the first control instruction is to be suspended or canceled and move away from the set target parking space to the evacuation space;
present, on an operation terminal operated by the operator, selection information for selecting a first mode in which an execution process for the first control instruction that is set is continued or a second mode in which the control device of the vehicle is caused to execute an alternative control instruction for moving the vehicle along the alternative route and stopping at the evacuation space, wherein the alternative route is different from the first route, and wherein the evacuation space is different from the set target parking space; and
execute the first control instruction or the alternative control instruction in accordance with selection input information that is input by the operator to the operation terminal.

10. A parking control method for calculating a first control instruction and causing a control device of a vehicle to execute the first control instruction on a basis of an operation command acquired from an operator, the first control instruction being for moving the vehicle along a first route to a target parking space, the parking control method comprising:
when detecting an obstacle object that obstructs movement of the vehicle on the first route after setting the target parking space and starting execution of the first control instruction for moving the vehicle along the first route to the set target parking space, setting an evacuation space, wherein the evacuation space is not a parking space;
calculating as an alternative route a route for the vehicle to leave the set target parking space and move to the evacuation space;
presenting the operator with selection information for selecting a first mode in which the execution of the first control instruction that is set is continued or a second mode in which the control device of the vehicle is caused to execute an alternative control instruction for moving the vehicle along the alternative route different from the first route;
calculating a first recommendation level of the first mode and a second recommendation level of the second mode in accordance with an attribute of the detected obstacle object;
calculating a value of the second recommendation level as a higher value as a distance between the operator and the vehicle increases;
when the first recommendation level is a higher value than the second recommendation level, displaying a first switch for receiving selection of the first mode in a more emphasized manner than a second switch for receiving selection of the second mode;
when the second recommendation level is a higher value than the first recommendation level, displaying the second switch for receiving the selection of the second mode in a more emphasized manner than the first switch for receiving the selection of the first mode; and
causing the control device to execute the first control instruction or the alternative control instruction in accordance with selection input information from the operator.

* * * * *